(12) United States Patent
Delano

(10) Patent No.: US 11,602,126 B1
(45) Date of Patent: Mar. 14, 2023

(54) BOWL-LIKE CONTAINER FOR HOLDING EDIBLE MATERIAL

(71) Applicant: Misa Design, LLC, Marietta, GA (US)

(72) Inventor: Cigdem Esin Delano, Marietta, GA (US)

( * ) Notice: Subject to any disclaimer, the term of this patent is extended or adjusted under 35 U.S.C. 154(b) by 164 days.

(21) Appl. No.: 16/586,039

(22) Filed: Sep. 27, 2019

Related U.S. Application Data

(63) Continuation of application No. 62/738,959, filed on Sep. 28, 2018.

(51) Int. Cl.
*A01K 5/01* (2006.01)

(52) U.S. Cl.
CPC .................. *A01K 5/0135* (2013.01)

(58) Field of Classification Search
CPC .. A01K 5/0135; A01K 5/0142; B65D 21/083; B65D 21/08
USPC ......................................................... 119/61.5
See application file for complete search history.

(56) References Cited

U.S. PATENT DOCUMENTS

| | | | | |
|---|---|---|---|---|
| 2,078,382 A * | 4/1937 | Hanshaw | ................ | A63B 37/14 |
| | | | | D21/713 |
| 2,591,482 A * | 4/1952 | Weltlich | ................. | B44D 3/128 |
| | | | | 220/700 |
| D361,632 S * | 8/1995 | Ratia | ............................. | D26/10 |
| 5,724,914 A * | 3/1998 | Nemeth | ............... | A01K 5/0114 |
| | | | | 119/61.55 |
| 5,881,670 A * | 3/1999 | Pelsor | .................... | A01K 7/005 |
| | | | | 119/61.54 |
| 5,975,016 A * | 11/1999 | Wesenhagen | ........ | A01K 5/0135 |
| | | | | 119/61.55 |
| 6,032,495 A * | 3/2000 | Leu | ....................... | D06F 39/024 |
| | | | | 68/17 R |
| D435,660 S * | 12/2000 | Yoo | .............................. | D24/214 |
| 7,306,112 B2 * | 12/2007 | Shepard | ............... | A01K 5/0135 |
| | | | | 220/506 |
| 7,392,761 B2 * | 7/2008 | Kujawa | ..................... | A01K 7/00 |
| | | | | 119/61.5 |
| D585,537 S * | 1/2009 | Weggelaar | .................... | D23/366 |
| 7,726,509 B2 * | 6/2010 | Shepard | ............... | A01K 5/0135 |
| | | | | 220/506 |
| D742,601 S * | 11/2015 | Holterhaus | ................... | D30/121 |
| 10,058,200 B2 * | 8/2018 | Smaldone | ............. | B65D 25/28 |
| 10,674,846 B2 * | 6/2020 | Smaldone | ............. | A47G 19/02 |
| 10,932,443 B2 * | 3/2021 | Simon | .................. | A01K 5/0135 |

(Continued)

*Primary Examiner* — Magdalena Topolski
*Assistant Examiner* — Kevin M Dennis
(74) *Attorney, Agent, or Firm* — Andrew S. Langsam

(57) ABSTRACT

A container for holding edible material is bowl-shaped and capable of maintaining the edible material held therein while an animal is consuming such edible material. Simply stated, in the preferred embodiment, the bowl resembles a cereal bowl bottom with an inverted cereal bowl top; with the top having a central opening. The container includes an inward and upwardly extending, smooth walled circular access aperture which assists an animal in consuming edible material by directing such edible material into a mouth and onto the tongue of the animal while preventing ears of the animal from coming into contact with the food in the container and ensuring food does not accidentally escape the bowl while the animal is licking the inside of the cavity. The container also includes a base that maintains the container in a stable and stationary position.

5 Claims, 16 Drawing Sheets

(56) References Cited

U.S. PATENT DOCUMENTS

| | | | | |
|---|---|---|---|---|
| 2005/0242100 A1* | 11/2005 | Shepard | ............... | A01K 5/0135 220/603 |
| 2007/0199512 A1* | 8/2007 | Ellis | ...................... | A01K 7/005 119/61.54 |
| 2007/0272695 A1* | 11/2007 | Shepard | ............... | A01K 5/0135 220/501 |
| 2008/0264345 A1* | 10/2008 | Kujawa | ............... | A01K 5/0128 119/61.5 |
| 2015/0173541 A1* | 6/2015 | Frangione | .............. | A47G 19/02 220/574.1 |
| 2015/0250138 A1* | 9/2015 | McKinnon | ........... | A01K 5/0128 119/61.5 |
| 2016/0242385 A1* | 8/2016 | Parness | .................. | F16M 11/38 |
| 2019/0000249 A1* | 1/2019 | Smaldone | .............. | A47G 19/02 |
| 2019/0098864 A1* | 4/2019 | Simon | .................. | A01K 15/025 |

\* cited by examiner

BOWL-LIKE CONTAINER FOR HOLDING EDIBLE MATERIAL

RELATED APPLICATIONS

This application claims priority from U.S. Provisional Application No. 62/738,959, filed Sep. 28, 2018, the disclosures and teachings of which are incorporated herein by reference.

TECHNICAL FIELD

The disclosure relates generally to a container, similar to a pet food bowl, for holding edible material, and more specifically, a sphere-like container basically formed of a first cereal bowl-like shape and a second, inverted and mating cereal bowl shape on the first, with the second or top bowl shape having a central aperture for allowing the snout and tongue of the animal to gain access to the central cavity while minimizing the ability of the animal's ears to touch the food within the cavity of the container. Of course, the container need not be symmetrical about a central vertical axis at all and could be, for example, an oblong shape or even an irregular shape. For ease of reading and understanding, the present invention will be described as a sphere-like (and thus not necessarily a sphere shaped) container for food and not a pet food bowl although the invention resembles (one bowl shape inverted onto another bowl shape) and could easily be referred to as a pet bowl. The present invention, in its preferred form, is more sphere-like than a simple bowl. It is configured to maintain the edible material held therein before and while an animal is consuming such edible material without significant mess to the animal nor to the surrounding area. The central opening on top of the container is provided with a small radius of curvature to present a smooth surface for the tongue of the animal and is limited in its ratio to the outermost diameter of the sphere-like container.

BACKGROUND AND DESCRIPTION OF THE INVENTOR'S CURRENTLY KNOWN RELEVANT PRIOR ART

There are many types of pet-food bowls or containers for holding edible material (e.g., food or liquid) for domestic pets and other animals. Some of these containers may be used to hold or store food, dry and wet and wet-dry food or liquid intended for consumption by animals such as, but not limited to, household pets, farm animals, assistance animals, circus animals, zoo animals, even animals in the wild, etc. However, such containers often do not account for the physical characteristics of the animals, such as a size and shape of the snout, shape and length of the tongue, long ears, etc. Consequently, some animals have a difficult time consuming the edible material cleanly without making a mess to themselves or to the surroundings. As such, there remains a need for an improved food bowl or edible food container for holding foodstuffs that accounts for the physical characteristics and eating manner of animals. Providing such a container which is easy to fill, clean, ship for sale, and is highly efficient in allowing for food consumption while minimizing food coming into contact with the ears of the animal and/or the surroundings upon which the container sits is a goal of the present invention.

U.S. Pat. No. 3,611,998 discloses a pet feeding bowl in the shape of an oblique truncated cone for reducing spillage and providing increased convenience of access. U.S. Pat. No. 5,975,016 discloses a bowl for feeding a dog that includes a reentrant lip and a concave curve which enables the dog to trap food with its tongue under the concave curve so as to enable the dog to devour the last morsels of food in the bowl. U.S. Pat. No. 6,619,230 discloses an integrated scoop that includes an access port for a user's hand, so as to allow the user to scoop up solid and liquid foods or mortar mix.

U.S. Pat. No. 7,296,539 discloses a feeding dish cover and a base structure having a depression for holding the feeding dish cover and a cavity for holding ice packs. U.S. Pat. No. 8,286,589 discloses a cover for a conventional bowl that prevents the bowl from sliding. U.S. Pat. No. 8,444,003 discloses a body having an upper collar that is used as a flowerpot for holding plants.

U.S. Pat. No. 8,474,406 discloses an ear prop placed over a bowl such that the ear prop is configured to prevent a pet's ears from contacting the substances in the bowl. U.S. Pat. No. 8,973,529 discloses a cover for a conventional bowl that prevents the bowl from sliding. U.S. Pat. No. 9,832,971 discloses a bowl having a plate member that is pivotable so as to cover the bowl.

US publication 2005/0211190 A1 discloses an ear prop placed over a bowl such that the ear prop is configured to prevent a pet's ears from contacting the substances in the bowl. US publication 2006/0060149 A1 discloses a spill-resistant fluid container that has a plurality of cavities within the chamber such that the cavities are able to perform fluid communication with each other. US publication 2007/0151010 A1 discloses a spill resistant cover designed to universally fit on to any conventional dish, such that the cover prevents water and food from splashing and spilling. US publication 2008/0022937 A1 discloses a spill-resistant container for providing water to pets that includes an anti-splash ring for resisting sloshing of the fluid within the container.

US publication 2013/0213307 A1 discloses a bowl having a spill-resistant rim that is connected to a bottle for holding water via a coupler. German patent application DE 202009008153 U1 discloses a dog bowl which includes an opening that prevents long ears of a dog for getting into the dog bowl.

U.S. Design Patent References Known to the Inventor

U.S. D467,044—Pet Bowl; U.S. D471,406—Bowl; U.S. D472,021—Pet Dish; U.S. D473,758—Angled Bowl; U.S. D504,196—Ergonomic Pet Bowl; U.S. D607,616—Pet Bowl Scoop; U.S. D718,004—Pet Bowl with a Contoured Bottom; U.S. D748,947—Bowl and U.S. D777,992—Angled Pet Feeder.

SUMMARY

In general, in one aspect, exemplary embodiments of the present application provide a sphere-like container for holding edible material in the central cavity which is provided with a top opening which limits the touching of the ears of the animal with the food and, yet, allows the snout and tongue of the animal to gain access to the food for eating. The container comprises an upper inverted, bowl-like portion including a top end and a wider and completely open bottom end. The top end has a central opening shaped and sized to allow for the animal's head, snout, mouth and/or tongue, to obtain and consume the edible contents of the container/bowl. The opening is preferably a central aperture with a smooth centrally-extending inner wall surface and is limited in its diameter to being within a range of 50 to 90% of the pet bowl's overall central diameter. This limits access of the width of the head of the animal into the bowl and, yet, allows the animal to obtain access to the contents of the container. As indicated below, the range of the opening for the animal's head, in the upper range, is about 80-90% of the maximum central diameter. Thus, in many cases, the bowl opening will most likely be large enough for a dog or cat's head to fit through if the bowl is deep enough. The limiting factor that keeps the head from going in is the depth of the bowl. The present invention is not designed to be deep like prior art bowls primarily designed to keep drooping ears out since the primary focus of the present invention is on keeping food in the bowl and the rim guiding food into the animal's mouth, allowing the animal to be able to lick food from under the rim. This allows the upper range of the opening to be acceptable. Keeping drooping ears out of the bowl is a secondary benefit when the opening is narrow enough (generally less than 80%).

The central aperture or top opening extends across the top end of the upper portion. The bottom end of the upper portion continues as a smooth wall of the sphere like container and mates with or continues as a bowl-shaped, lower portion (the device can be made in two separate and mating bowl shaped pieces or a single sphere like piece) and the top end of the lower portion has a wide opening which matches the opening at the bottom of the top portion. The top and bottom portions (whether as a single piece or two matingly connected pieces) thus define a large central, hollow, spherical cavity extending between the base of the bottom portion and the top and open central aperture of the top portion. This sphere-like cavity will hold a quantity of food for consumption by the animal. In both embodiments of the present invention (a single cavity formed like a sphere with flat base and central top aperture and a container formed of two bowl shapes that mate to form a sphere-like food container) a central protrusion is formed around the main diameter of the container. This protrusion will allow the device to be placed into a tripod-like support or holding device, with the protrusion resting on the tripod's center ring-like aperture, which thereby allows the container to be supported above the floor upon which the tripod's legs rest. The protrusion also reduces the tendency of the container to remain in a tipped over position as the sphere-like device or food holding container with a protrusion wrapping around its central and largest diameter tends to disallow the opening to becoming inverted with food to fall out and tends to allow and facilitate the container to rotate back to its stable position, with the base on the floor (if not within a tripod or other holding device) and the central aperture directed upwardly.

A central aperture or rim is defined in the top end of the upper portion. The wall defining the rim is smooth and its curve presents a smooth and inwardly directed smooth wall which radially extends upwardly and toward the center of the container. This allows the tongue of the animal to easily lick along the inside of the container, at the top, without getting messy, reduces food from being flung to the outside, and maintains most of the food within the container. The profile of the smooth edge of the central aperture or rim has a radius of curvature which is small and can be about the same as the radius of curvature of the protrusion described above. In one or more embodiments, however, the protrusions need not be present but, in any event, the radius of curvature of the rim or access opening is small.

Implementations of the various exemplary embodiments of the present application may include one or more of the following features: A food holding, sphere-like bowl-shaped container with a support base having a top side and a bottom side, with the top side of the base being connected to the bottom of the lower portion of the bottom bowl shape of the sphere like container. The bottom side of the base is in contact with a floor or other support surface having the container thereon. The bottom side of the base can be provided with anti-slip material and serves to prevent the container from moving, such that the container maintains a stationary position on the support surface, likely a floor. The bottom side of the base covers a larger footprint or surface area than the top side of the base to ensure stability. But, of course, they can be the same surface area or the top side can be larger than the bottom side.

In the embodiment where the sphere like food-holding container comprises two separate pieces, not spun nor made from a single sphere like piece, the bottom is like a cereal bowl and the top an inverted cereal bowl, the two bowls being of about the same large opening and diameter so that the top bowl, when inverted, will sit and mate and couple to and on the opening of the bottom cereal like bowl. In this two-piece embodiment or configuration, the bottom and open end of the upper and inverted bowl like portion and the top and open end of the lower bowl like portion can be held together by a mechanical and/or magnetic coupling means. This will allow the top inverted bowl to sit on the bottom bowl, large opening adjacent large opening, to form a sphere like, empty cavity of a container for the food. The coupling mechanism may include a first helical groove disposed on the bottom edge of the upper bowl portion and a second helical groove disposed on the top edge of the lower bowl portion that corresponds to the first spiral groove. The upper portion is capable of being interlocked with the lower portion by rotating the upper portion with respect to the lower portion while having the first helical groove be in contact with the second helical groove. The coupling mechanism can also include a first set of magnets attached to the bottom flange or edge of the upper portion and a second set of magnets attached to the top edge of the lower bowl like portion. The first set of magnets has a different polarity from the second set of magnets thereby allowing the upper portion to be easily yet removably coupled to the lower portion via magnetic attraction. The two piece version of the present invention allows the device to occupy smaller space on store shelves and in shipping, to the advantage of the retailer and seller and yet allows the consumer to construct the sphere like container for intended use (while allowing for disassembly during washing operations and for storage).

In general, in one aspect, exemplary embodiments of the present application provide a food holding and dispersing container for edible material. The sphere like container with a generally sphere like central cavity for the food comprises an upper portion including a top end and a bottom end, such that an aperture or opening extends around the top end of the upper portion. The lower end of the top portion defines a relatively large diameter opening, larger than the central opening of the top of the upper portion. That defines the large diameter of the sphere like container. And, the top of the bottom portion has a similar large diameter which is the same as that of the upper portion so that, when the top bowl like halve of the device is inverted onto the bottom bowl like halve of the bottom portion, the two bowls mate and form a single sphere with a central sphere like cavity. The bottom of the bottom end is provided with a flat base and the top of the top portion is provided with the central opening for the animal's snout and/or tongue. That central and top-located opening defines a smooth walled, small radius of curvature opening, aperture or rim located at the top end of the upper portion. The rim has smooth walls to allow the animal's tongue to easily glide thereover, even on the inside of the central cavity.

Implementations of the various exemplary embodiments of the present invention may include one or more of the following described and/or illustrated features. The container or bowl-like food holder may also include a support base having a top surface or side and a bottom surface or side, with the top surface or side of the base being releasably connected to the bottom end of the lower portion. Of course, it can be integrated therewith as a one piece unit. The bottom surface or side of the base is in contact with a planar support surface (like the floor of a kitchen for a domestic pet) having the container thereon. It can be on an elevated box or step, too. This bottom surface or side of the base prevents or at least minimizes the container from moving, such that the container maintains a relatively stationary position on the floor/surface. The bottom surface or side of the base covers a larger surface area than the top surface or side of the base. This minimizes material for manufacture and shipping/storage and, yet, provides for a sturdy yet streamlined appearance.

The bottom end of the upper portion or inverted bowl like element and the top end of the lower portion of the second bowl like element (which can be mated and secured together) may include mechanical and/or magnetic coupling means. The coupling means may include a first helical or spiral groove disposed on and around the circumference of the upper portion and a second helical or spiral groove disposed on the lower portion and extending around its circumference that corresponds and mates with the first spiral groove. The upper portion is capable of being interlocked with the lower portion by rotating the upper portion (about an axis passing vertically through the center of the opening of the container) with respect to the lower portion while having the first helical or spiral groove in contact with the second helical or spiral groove. The coupling means can also or alternatively include a first set of magnets attached to the bottom end of the upper portion and a second set of magnets attached to the top end of the lower portion. The first set of magnets will be provided with a different polarity from the second set of magnets thereby allowing the upper portion to be coupled to the lower portion via simple magnetic attraction.

In general, in one aspect, exemplary embodiments of the present invention provide a container or bowl-like food holding assembly for edible material. The container assembly comprises a holding cavity in a container having an upper portion including a top end and a bottom end, such that a central opening extends across the top end of the upper portion. And, either the upper portion or the lower portion includes one or more protrusions that extend radially outwardly away from the large diameter of the sphere like device. The protrusion(s) are larger in diameter than a ring of a support tripod or support platform and serve to support the container above the floor or a planar surface upon which the tripod or support platform rest.

Implementations of the various exemplary embodiments of the present invention may include one or more of the following described and illustrated features. A support portion of the tripod or support platform includes a hollow ring having a central opening, such that, when the container is held on the support portion, the lower portion of the container sits within and passes through the opening of the hollow ring and the one or more outward protrusions of the upper portion rest upon the top surface of the hollow ring of the tripod, such that the container is suspended on and by the tripod or the support platform. Each of the plurality of legs to the tripod or support members may include a long thin rod, extending down to the floor in a flared outward manner, from ring to floor. In addition, each of the plurality of support members include a first end that is connected to the support portion of the tripod and a second end that directly sits upon the floor or support platform. Further, each of the second ends of the plurality of legs or support members is in contact with a planar surface having the support platform thereon. Each of the second ends of the plurality of support members can have rubber or other slip-preventive surfaces to prevent or minimize the support platform from moving on the floor, such that the support platform maintains a substantially stationary position on the surface of the floor. The combination of the outward flare of the legs of the tripod or support members and their ends being coated with slip-preventative material, ensures stability and reduces the tendency for the container to laterally move about and/or tip, even while the animal is accessing the food contained in the container.

The bottom end of the upper portion of the container and the top end of the lower portion of the container include mechanical and/or magnetic coupling means. Allowing easy disassembly and re-assembly allows for the device to be easily disassembled for storage and shipment, thoroughly cleaned between uses and easily assembled for use.

In general, in one aspect, exemplary embodiments of the present invention provide a container in a bowl-like manner for holding edible material and allowing an animal to eat the edible material with ease and without mess to the animal and to the environment. The container comprises a container or cavity-holding body having a top hemi-sphere like end having a central opening and a bottom hemi-spherical end that is closed, the container body when assembled (or if molded or made as a single piece) having a diameter that gradually and smoothly increases from the top open aperture or end as it extends downwardly towards its bottom, and the bottom hemi-spherical base member, extending down to a supporting base. The central aperture or open rim defines an opening for the animal's mouth or snout, at the top end of the container body.

Implementations of the various exemplary embodiments of the present invention may include one or more of the following described and/or illustrated features. The container also includes a base having a top side and a bottom side, the top side of the base being connected to the bottom end of the container body. The base may be integral or separable to the container body. The bottom side of the base is in contact with a planar surface (the floor) having the container thereon, and the bottom side of the base also prevents or at least minimizes the container from laterally moving even while in use by a feeding animal, such that the container tends to maintain a stationary position on the floor surface. The container body defines a relatively large central and food-holding hollow interior or cavity for holding the edible food for the animal.

BRIEF DESCRIPTION OF THE DRAWINGS

The aforementioned invention, and other aspects, features and advantages thereof can be more readily understood from the following detailed description with reference to accompanying drawings wherein.

DETAILED DESCRIPTION OF THE FIGURES AND THE PREFERRED AND ALTERNATE EMBODIMENTS

Figure 1:
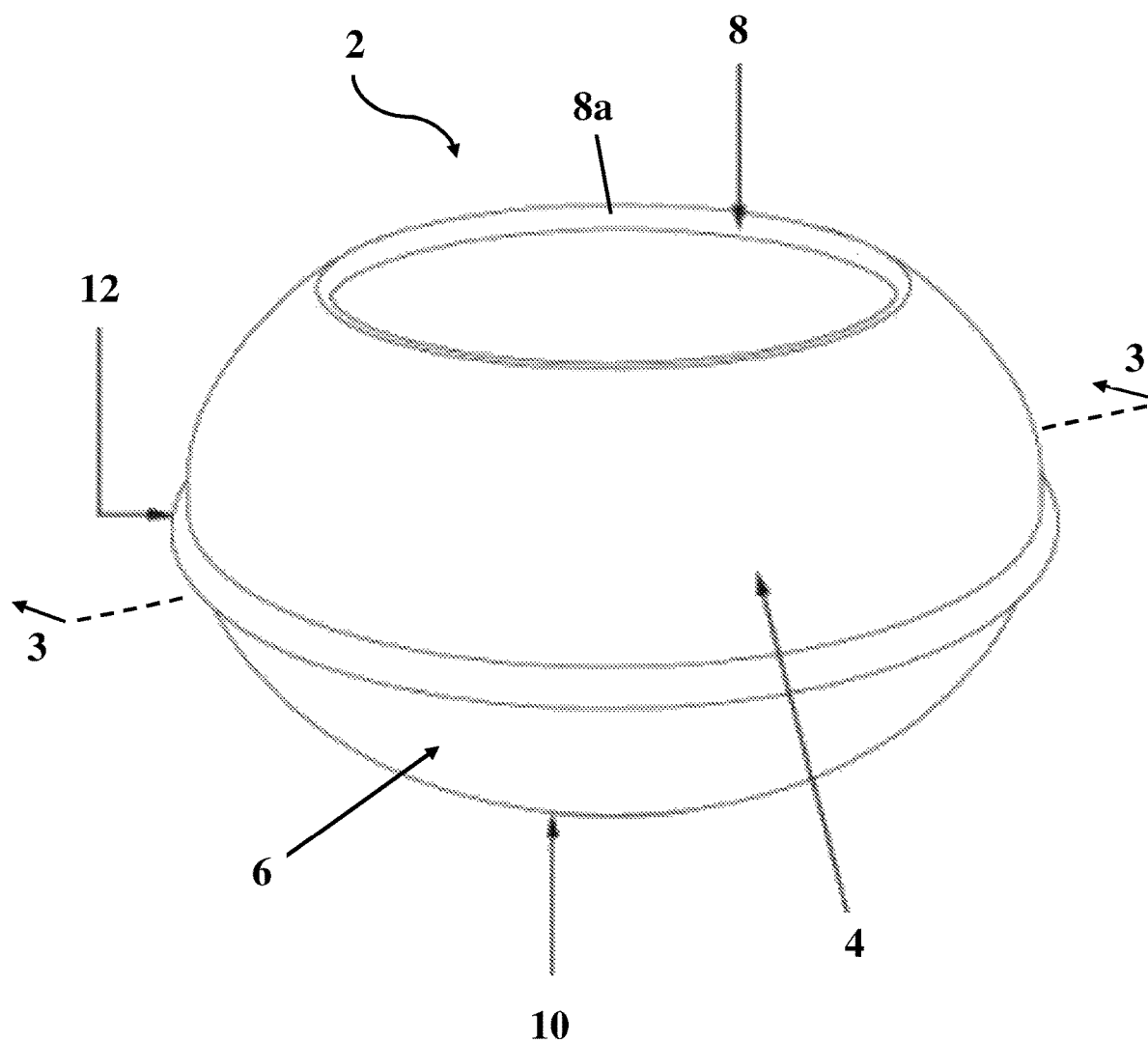
FIG. 1 shows a front, side and top perspective view of a bowl-like container for holding edible material, according to an embodiment of the invention.

In describing preferred embodiments illustrated in the drawings, specific terminology is employed herein for the sake of clarity. However, this disclosure is not intended to be limited to the specific terminology so selected and it is to be understood that each specific element includes all technical and functional and mechanical equivalents that operate or function in a similar manner. In addition, a detailed description of known functions and configurations is omitted from this specification when it may obscure the inventive aspects described herein. It should be appreciated by those skilled in the art that while various examples of food containers and pet food bowls are discussed herein, the inventive aspects of this disclosure are not limited to such examples herein.

Referring now to the drawings, wherein like reference numerals designate identical or corresponding parts throughout the several views, FIGS. 1-6 illustrate an alternate embodiment of the bowl-like container 2, i.e., a first two piece embodiment. The preferred embodiment is a single piece container, however. In both the two piece and the single piece container, however, a protrusion or set of outwardly extending protrusions preferably laterally i.e., radially extend around the sphere-like container, to sit upon a ring of a support surface, preferably a hole in a support base or a ring in a tripod. Preferably, the protrusion(s), described below, are located at and extend around the largest diameter of the sphere-like container but it could also be located anywhere from the bottom of the lower half of the device to the large central diameter or even above that, if the protrusion comprises outwardly extending flanges or radially extending support elements for contact and support by the ring of the hole or the tripod.

The container 2 may be used, for example, to hold solid (or semi-solid) inorganic or organic substances for animal consumption (e.g., food, pet food (dry or wet), medicine, vitamins, supplemental nutrients, etc.) and/or liquid (e.g., water, juice, liquid medicine, vitamins, supplemental nutrients, etc.). In an exemplary embodiment, the container 2 may be in the shape of a sphere-like container or bowl with a large central and substantially internally rounded cavity which, however, closes to an opening of smaller diameter than the maximum diameter of the bowl, at a top opening, aperture or lip. The container 2 may be made of materials that include, but are not limited to, stainless steel, plastic, silicone, melamine, ceramic, china, wood, glass, and/or rubber or similar durable materials. And, the invention can be made of recycled plastic, paper, etc., too.

Figure 4:
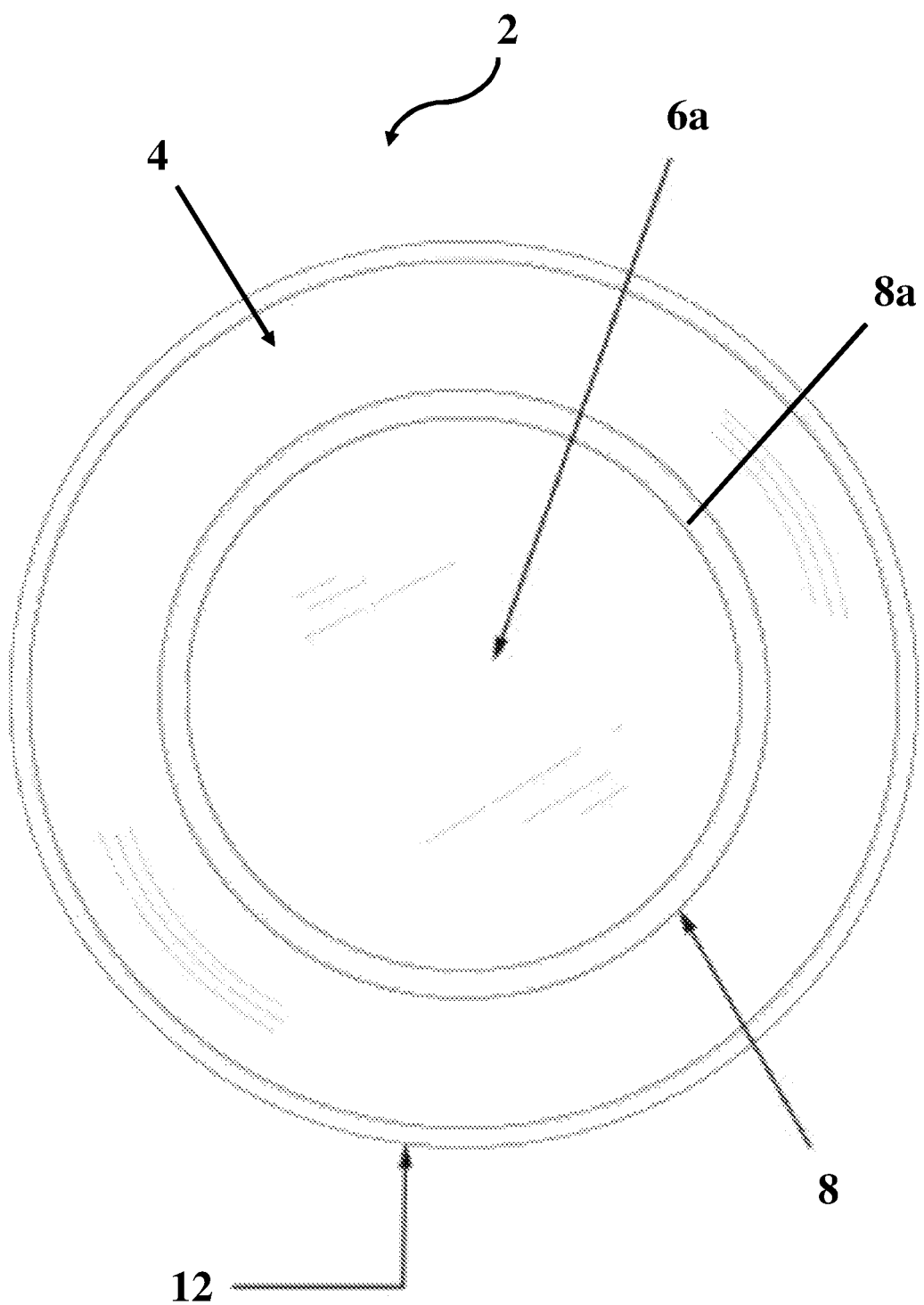
FIG. 4 shows a top plan view of a container for holding edible material, according to the embodiment of the invention shown in FIG. 1.

In FIG. 1, which is a side and top perspective view of the two piece or alternate embodiment of the invention, the container 2 of the present embodiment includes an upper inverted bowl or hemi-sphere portion 4, a lower bowl or hemi-sphere portion 6 (the two bowls or hemi-spheres being of about the same relative dimensions, at least at their largest diameters), a top central aperture or opening defined by a rim 8 in the upper portion, a bottom base 10 extending from the lower hemi-sphere and a radially, outwardly extending side protrusion 12. As shown in FIG. 4, which is a top elevational view of the container 2, the upper portion 4 is primarily smoothly curved surface (a roughened outer surface can be used, too) and, starting from the top aperture, opening, lip or rim, increases downwardly in diameter, like an inverted cereal bowl from its base (at the now top) to its bottom or downwardly extending large opening. The inside of the upper hemi sphere or portion defines a central hemi-sphere like cavity which extends from the top end of the upper portion 4 (at the lip 8) to the bottom end of the upper portion 4 at the large diameter. The central lip 8 defines the food-access opening and the mating large diameter opening for attachment to the bottom hemi-sphere portion, at the bottom of the upper portion 4, are concentric openings with one another. Both the lip and the bottom large opening of the upper portion are defined by a central axis, passing vertically through the centers of the lip and the bottom end of the upper hemi spherical portion. Of course, they could be off-center to one another and even non-circular but in the preferred embodiment and even in this alternate embodiment, the surfaces are circular, concentric and smooth curved walls. The bottom edge of the upper hemispherical portion 4 is, in this two piece alternate embodiment, preferably releasably connected to the mating large central opening of the bowl shape or hemi-sphere configuration of the lower portion 6.

In an exemplary and the preferred embodiment of the present invention, the upper hemispherical portion 4 is integrally formed with and a smooth wall connection to the lower hemi-spherical portion 6. But, having the upper portion and the lower portion separable allows for ease of packing, shipping, and cleaning. In this exemplary embodiment, the upper portion 4 and the lower portion 6 are separate elements such that a securing mechanism (e.g., glue, screwing, snapping, clipping, pressing, magnetically attached together, or any other coupling/decoupling methods, etc.) can be used to permanently or selectively releasably couple the upper hemispherical portion 4 and the hemispherical lower portion 6 together. In yet another exemplary embodiment, the upper portion is integrally connected with the outside protrusion or rim and the lower portion 6 is integrally connected with or a machined continuation of the base 10 such that the container 2 is comprised of just two parts. This permits easier cleaning, storing or packaging of the container 2 as the upper portion can be flipped into the lower portion to conserve space (or vice versa). As the upper portion 4 extends from the bottom end (the protrusion) of the upper portion 4 towards the central aperture or lip 8, the diameter of the upper portion 4 decreases, i.e., the upper portion and the inside cavity defined thereby curves inwardly and upwardly towards the top and center of the container 2. In an exemplary embodiment, the thickness of the upper portion or hemispherical section 4 slightly decreases from the bottom end or protrusion of the upper portion 4 towards the top end or central aperture of the upper portion 4 (as can be seen in FIG. 3) although the side wall can be substantially a constant thickness from the protrusion to the top aperture, lip or opening 8.

Figure 3:
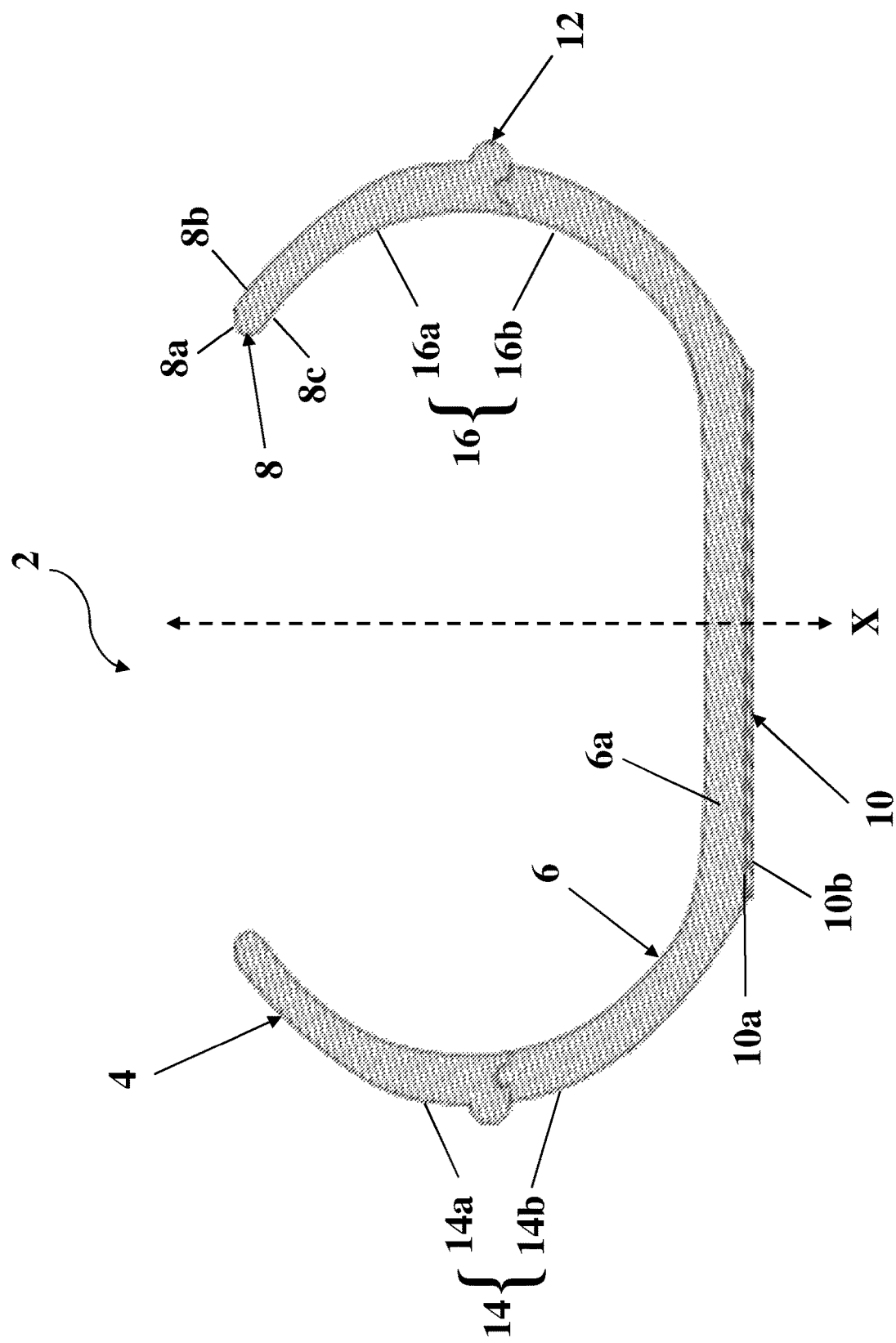
FIG. 3 shows a cross-sectional view of a container for holding edible material, taken along the lines 3-3 of FIG. 1 and according to the embodiment shown in FIG. 1.

As shown in FIG. 3, which is a cross-section of the two piece container 2, the upper portion 4 includes a smooth outer wall and upper exterior surface 14*a* and a smooth, inner wall and upper interior surface 16*a*. A protrusion 12 extends around the entirety of the upper portion, at its lower end, but can be formed of one or more segments, if desired. This is a projection (or one or more such radially outwardly projecting components) that is (are) disposed on the exterior and upper surface 14*a* (but at its lower end) such that the protrusion 12 extends radially away from the bottom end of the upper portion 4. For example, the protrusion 12 (like a smooth wall ledge or flange which extends outwardly) may extend in a substantially perpendicular direction away from the inside of the bottom end of the upper portion 4. In addition, the protrusion 12 encircles the upper exterior surface 14*a* of the upper portion 4 such that the protrusion 12 is concentric with the center axis X (see FIG. 3) of the container 2 (and by extension, the upper portion 4). The protrusion 12 may have a curved outer surface, like a bump out, or a semi-circle cross-section, as shown in FIG. 3. The protrusion 12 may extend completely around the hemispherical container or be longitudinal elements with spacings therebetween. The protrusion is configured such that a support platform (e.g., support platform in the basic form of a hole in an elevated step or floor or a ring of a tripod, See FIG. 6) may hold the container 2, as discussed infra. The circular ring of the tripod or support platform will slide under and hold the protrusion 12 so that the container 2 is held above the floor. Stated differently, ball-like container can be dropped into the hole or the ring of the tripod and held above the floor by the length of the legs of the tripod. Thus, clearly, the hole of the support platform or the ring of the tripod is substantially the same or slightly less in diameter than the inside diameter of the protrusion of the container. In an exemplary embodiment, the upper hemi spherical portion 4 including the lip, aperture or central rim 8 may be configured such that the upper portion 4 can be attached to a conventional domestic animal feeder container without the need for the lower portion 4 or the base 10. By itself the upper portion is effective to enable an animal to feed without mess to itself and the surroundings. Some holding or securing mechanism is likely appropriate if the feeding container comprises only the upper semi-spherical portion with central opening or aperture and outwardly extending protrusion, for support.

As shown in FIGS. 1, 2, 3, 5 and 6, the lower hemi spherical portion 6 is a smooth, curved surface, too, like a cereal bowl, such that the lower portion 6 substantially forms a base with a substantially flat element or base 6*a* allowing the lower portion 6 (and by extension the container 2) to balance or hold itself steady on a floor surface without too easily tipping or falling over. In an exemplary embodiment, the base member 6*a* is parallel with the bottom of the base 10. The base member is concentric with the aperture or lip, the central opening, 8, and has a center also about upon the center axis X of the container 2.

In this embodiment, the top and open end of the two-piece lower bowl-like portion 6 is connected to the bottom end of the upper and inverted bowl-like top portion 4. The outside of the bottom is a smooth wall surface. The bottom of the bottom portion 6 is provided with a basically flat, thin, base element 10. As shown in FIG. 3, the top and open end (in the two piece version of the invention) of the lower portion 6 includes a large and opening which mates and couples to the large and central opening of the top hemi spherical portion. The upper and lower portions, when assembled, form a bowl like member with a top opening and support base, where the top aperture is clearly less wide than the large central diameter of the bowl. The bowl-like food holding device defines an interior cavity for holding the edible foodstuff for the animal. Yet, the animal can pass its tongue, mouth, snout, head, etc. to take food from the cavity, without creating a mess to itself and the surroundings.

Since the bottom end of the lower portion 6 is a closed end (i.e. the base 6*a*) the central cavity of the container holds objects that have passed through the top lip, aperture, rim or opening 8. In other words, the combination of the rim 8, the upper portion and the lower portion 6 results in a holding vessel having a hollow interior food-holding cavity with an opening so as to store foodstuffs therein and allow the same to be selectively removed.

As the lower portion 6 extends from the base 6*a* towards the top end of the lower portion 6, the lower portion 6 bows or curves outwardly away from the center axis X of the container 2. This can be seen in FIG. 3. The diameter of the interior cavity at the base 6*a* increases as the lower portion extends upwardly towards the top of the lower portion, i.e., at the protrusion(s). In an exemplary embodiment, the thickness of the upper portion 4 decreases from the bottom end of the upper portion 4 towards the top end of the upper portion 4. As for the lower portion, the thickness of the same may be substantially constant from the base 6*a* to the upper end of the lower portion (near the protrusions) or it can slightly increase, from the thickness at the bottom base up to the top large diameter or opening of the lower portion. Such a feature allows the container 2 to store more food and have a lighter-weight—due to less material being used. In yet another exemplary embodiment, a thickness of the lower portion 6 is constant (i.e. the same) from the bottom end of the lower portion 6 towards and to the aperture 8 at the top of the top portion. Such feature may allow the container 2 to be stronger, easier to manufacture and more stable. As shown in FIG. 3, the lower portion 6 includes a lower, smooth walled, exterior surface 14*b* and a lower interior surface 16*b*. In this exemplary embodiment, the protrusion 12 is disposed just above the lower portion such that the protrusion 12 extends outwardly and away from the top end of the lower portion 6. When the upper portion 4 and the lower portion 6 are connected to each other, the upper exterior surface 14*a* of the upper portion and the lower exterior surface 14*b* of the lower portion form a substantially smooth exterior curved surface 14 (except for the protrusion 12) and the upper interior surface 16*a* and the lower interior surface 16*b* form a smooth interior curved surface 16 of the central cavity. Elimination of rough edges is believed desirable.

The rim, central aperture and lip 8 at the top of the container, is basically a circular opening into the cavity of the container. It is a smooth wall continuation of and connected to at least a portion of the top end of the upper portion 4, as shown in FIGS. 1-4 and 6. In an exemplary embodiment, the rim 8 is secured to the top end of the upper portion 4, such that the rim 8 encircles the entire top end of the upper portion 4, thereby creating an opening that is concentric to the bottom end of the upper portion 4 and its center is aligned with the axis X, shown in FIG. 3. The central aperture or rim 8 provides access to the central cavity and the foodstuff contained thereon. Preferably, the rim or lip is made of the same material as the container 2 or it can be made of a different material (like a soft rubber) from the container 2.

The rim 8 may include a free edge or end 8*a*, an exterior side surface 8*b* and an interior side surface 8*c* (See FIG. 3). The free end 8*a* may be smooth walled, curved, rounded, rolled inward, curved inward, etc. The free end 8*a* is a continuation of and thus connected to an exterior side surface 8*b* and an interior side surface 8*c* such that the free end 8*a*, the exterior side surface 8*b* and the interior side surface 8*c* form a continuous smooth surface. No rough edges should be present so as to minimize any discomfort to the feeding animal. As shown in FIG. 3, the radius of curvature of the aperture or lip 8 is small, in comparison to the radius of curvature of the inside cavity or the outside surface of the container. It need not be but smoothness of the lip, from outside wall to inside wall is considered highly beneficial. The exterior side surface 8*b* of the rim 8 forms a steady continuous smooth and curved surface and the inside side surface 8*c* is similarly smooth and curved with the interior curved surface 16*a* of the upper portion 4 and the interior side surface 8*c* of the rim 8 forms a steady continuous surface with the interior curved surface 16 of the upper and/or lower hemi spherical portions. As a result of such configuration, the rim or central aperture 8 may have substantially the same internal and external smooth wall connections as at 8*b* and 8*c*. The lip or central aperture 8 is deliberately smooth and curved, and not comprised of hard turns nor straight edges. This is to protect the surface of the animal's tongue as the same glides around the central aperture, while removing food from the cavity.

Figure 2:
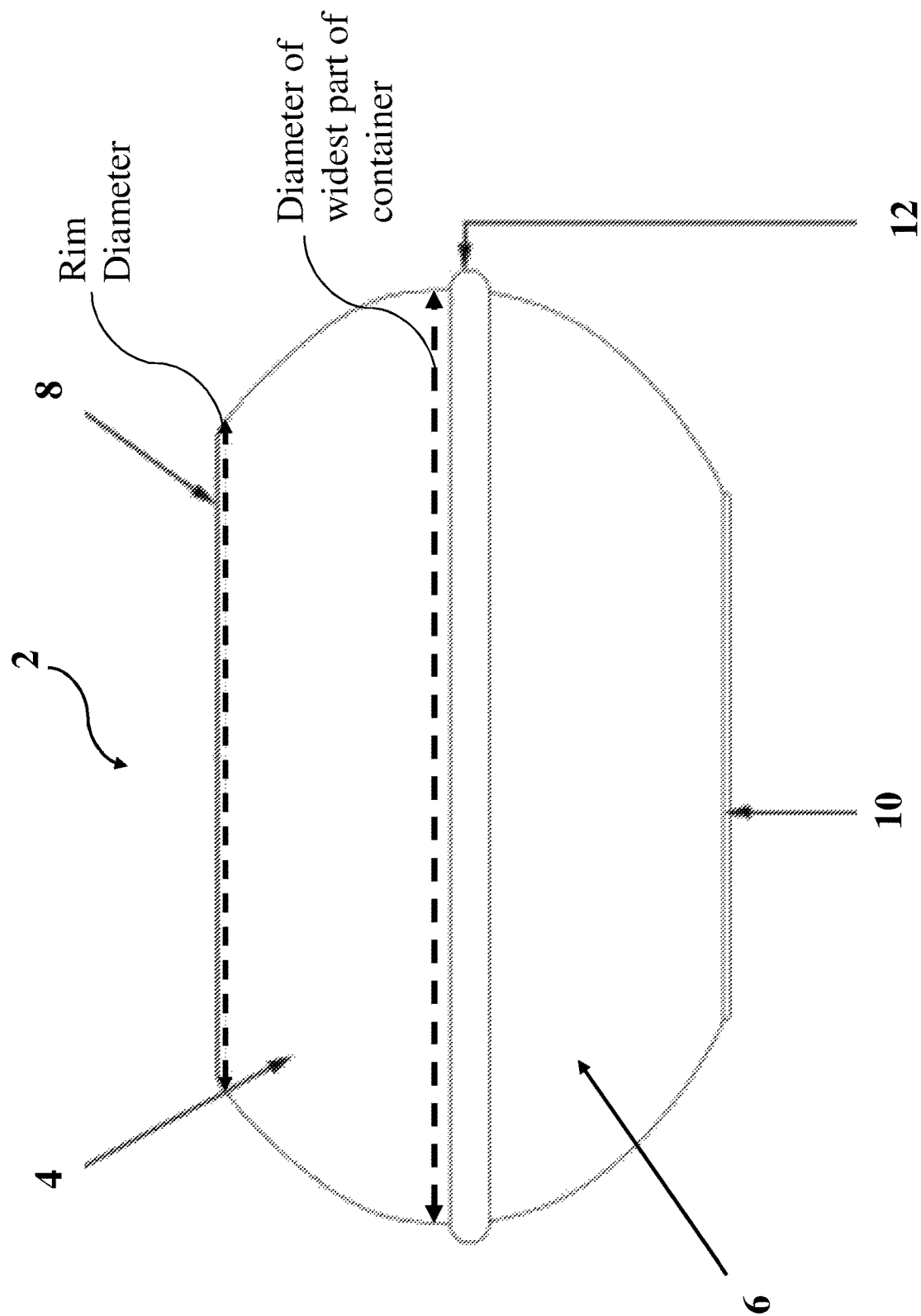
FIG. 2 shows a side elevational view of a container for holding edible material, according to the embodiment shown in FIG. 1.

In one example, the rim 8 may extend inwardly towards the axis X such that the aperture or rim 8 extends towards the center of the container 2. In other words, the rim 8 gently curves inwardly towards a middle or center of the container 2. The amount that the rim or central aperture 8 curves inwardly towards the center of the container 2 may be defined as a relationship between the diameter of the rim or central aperture 8 and the diameter of the widest part of the container 2 (without consideration of the protrusion 12), as shown in FIGS. 2 and 3. For example, the diameter of the opening at the central aperture or rim 8 may have a range between 50% to 90% (preferably between 74% to 83%) of the diameter of the widest part of the container 2. This ratio/range allows for the opening to be wide enough for the snout and tongue/mouth of the animal to withdraw food without difficulty and, yet, the diameter is small enough to maintain the bulk of the food within the cavity as a portion is withdrawn by the animal during eating/feed time. The range of the ratio of the aperture diameter to the diameter of the large diameter of the "belly" of the bowl/container allows for a good deal of food to be in the container, allows for ease of withdrawal and, yet, reduces and may eliminate the tendency of the animals ears to come into contact with the food. This eliminates mess. Also, as mentioned, it is important that the present invention provides for an access opening allowing the animal to lick food off the underside of the rim without food getting trapped under the rim.

The widest part of the container 2 may be measured at the diameter of the bottom end of the upper portion 4 or the diameter may be measured at the top end of the lower portion 6. In another example, if the widest part of the container 2 (e.g., bottom end of upper portion 4 and/or top end of the lower portion 6) is 4 inches, then the opening or aperture at rim diameter 8 would be in the range of 2.inches (50%) to 3.760 inches (and preferably range from 2.96 inches (74%) to about 3.32 inches (83%). It should be noted that the widest part of the container 2 may be both the diameter of the bottom end of the upper portion 4 (in the two piece embodiment) and the diameter of the top end of the lower portion 6, at the same time while the diameter of the aperture is at the opening or top of the container. It should also be noted that the widest diameter or part of the container can be defined as the internal diameter of the bottom end of the upper interior surface 16*a* (see FIG. 3) or the diameter of the top end of the lower interior surface 16*b* in comparison to the diameter of the central aperture 8, whether taken at the inside lip (where lip surface 8*a* merges with interior surface 8*c*) or at the outside surface, where lip surface 8*a* merges into exterior surface 8*b*. The measurements need not be exact but the approximate range is important to maintain so that the central aperture is wide enough for the head, tongue of the animal and the ease of filing the cavity and, yet, the belly is wide for holding substantial food, and, yet, further, the central opening is not too large to allow for the animals ears to come into messy contact with the food. And, again, as mentioned, the construct of the invention presents the curvature of the access opening at an angle and smoothness and radius of curvature to enable the animal to lick food off from under the access opening i.e., the access opening guides the food into the animal's mouth, without flinging food out of the bowl and prevents food from getting trapped under the rim.

In another example, the edge 8*a* of the central aperture or rim 8 may be in basic parallel orientation with respect to the base 6*a* of the lower portion 6. Or, the free end can slightly tilt down into the center of the cavity. Smoothness is important and relative size vis a vis the diameter of the container at the belly is believed important. In an exemplary embodiment, the rim 8 can be a removably attached extra ring-like piece which secures to the top edge of the upper portion. This piece can be removed for cleaning and periodic replacement, as needed. It can adhere or snap onto the top of the upper portion of the container. In another exemplary embodiment, the rim 8 can be configured to extend radially inwardly even further because of a new ring being secured at the top of the aperture, the ring extending towards the center of the container 2 so as to allow an animal having a snout and/or non-erect ears (i.e. droop), such as a dachshund, a beagle, a lop-eared rabbit, etc., an easier time (with less mess) in consuming food or liquid from the container 2. The snout of the animal can enter the container 2, while the rim or central aperture 8 keeps the non-erect ears of the animal from entering the container 2 and becoming dirty from the food or liquid within.

The thin, preferably rubber-like material of the base 10 is connected to at least a part of the bottom surface of the lower portion 6, as shown in FIGS. 1-3, 5 and 6. The thin base element 10 may include a top surface or side 10*a* and a bottom surface or side 10*b*. In an exemplary embodiment, the top side 10*a* and the bottom side 10*b* extend to cover the same surface area. The top side 10*a* is secured and/or connected to the bottom and planar end of the lower portion 6 and the bottom surface or side 10*b* is in contact with a surface (e.g., floor) having the container 2 placed and supported thereon. In an exemplary embodiment, the base 10 is formed of rubber or skid-proof material and can be glued to or integral to the lower portion 6. In another exemplary embodiment, the base 10 is separate from the lower portion 6. The base 10 may be configured to prevent the container from tipping over or may further assist the base 6*a* of the lower portion 6 from tipping over. Further, the bottom side 10*b* of the base 10 may include a non-skid surface (bumps or ridges) that prevent or substantially reduce movement of the container 2 due to an exterior force, like the pushing of the container by an animal during feeding. As such, the base 10 is configured to maintain the container 2 in a stationary position. The shape of the non-skid surface can be a paw, a bone, or any other shape and thus can serve as a fanciful design or a design which carries the trademark and other information for the manufacturer.

Figure 5:
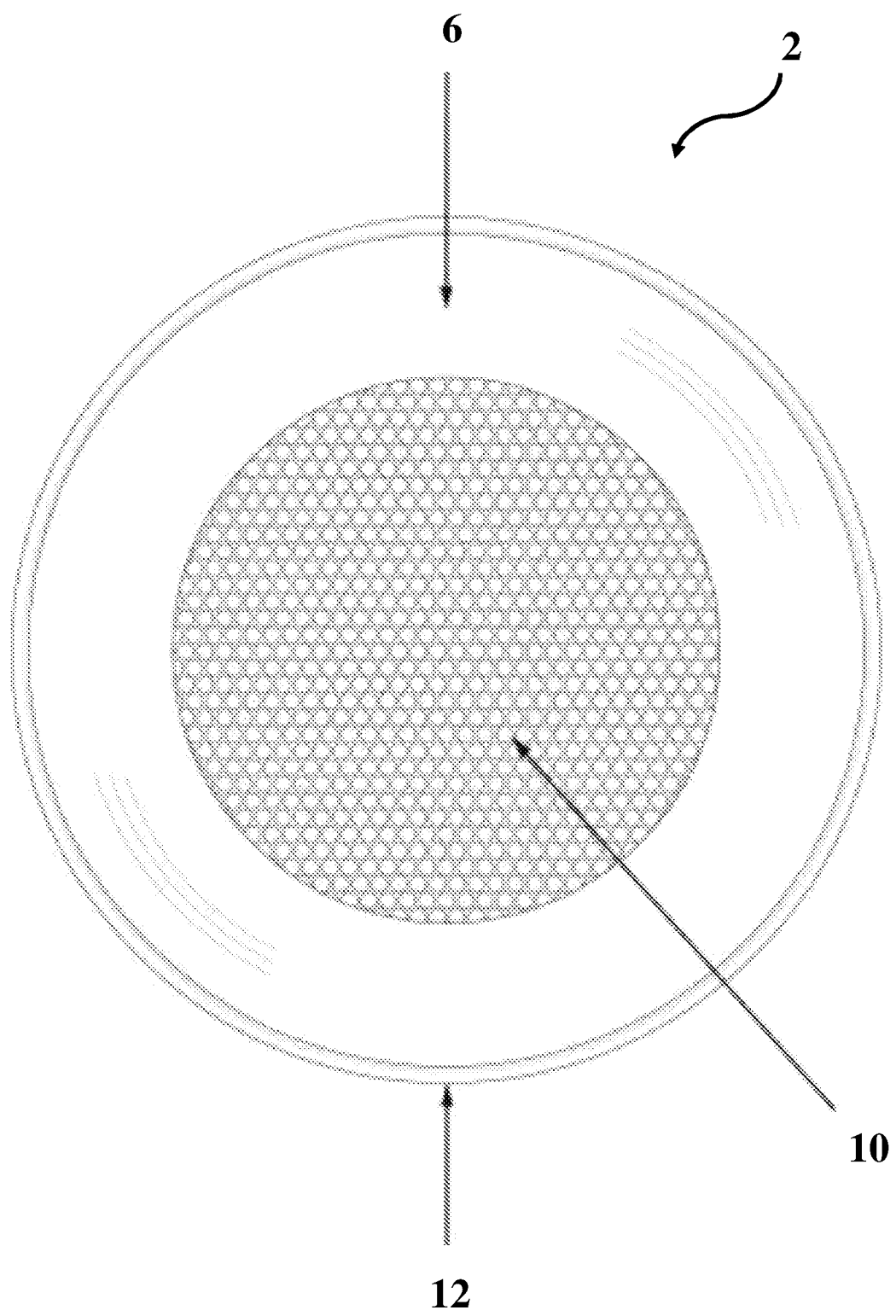
FIG. 5 shows a bottom plan view of a container for holding edible material, according to the embodiment of the invention shown in FIG. 1.

The base 10 may be composed of, or bonded in, rubber, silicone, or other material that prevents or substantially reduces movement of the container 2 due to an exterior force. In an exemplary embodiment, the base 10 may be composed of a same material as the lower portion 6 (or the container 2) or may be composed of different materials from the lower portion 6 (or the container 2). As shown in FIG. 5, the base 10 may substantially cover the bottom planar end of the lower portion 6 such that the lower portion 6 does not come into contact with, for example, a surface (e.g., floor) that the container is placed upon. In an exemplary embodiment, the base 10 may be made into any shape, such as, circle, rectangle, square, diamond, triangle, or any other polygon.

In an alternate embodiment of the invention, the bottom of the base can be formed into a distinctive shape so that the bowl/container is identifiable as between another. And, of course, the shape can serve as a trademark or distinctive trade dress, too. So, for example, the bottom of the base can be formed into a paw shape, bear the name of the pet, etc.

As such, the combination in the container 2 of the upper hemispherical portion 4 and the lower hemispherical portion 6 constitute a physical holder to store edible material such as food (or liquid). The central and top aperture or opening of the rim 8, upper portion 4 and top end of the bottom portion 6 allows an owner to easily place the edible material into the container 2. When an animal, such as a cat or a dog consumes the edible material that is placed in the container 2, the animal may utilize its tongue to lick the edible material off the interior curved surface 16, formed by the upper interior surface 16*a* and the lower interior surface 16*b*, of the container 2. When the animal performs such action, the smooth interior curved surface 16 guides the tongue of the animal upwardly towards the rim 8 and the inner surface 8*c* of the container 2 such that the edible material is disposed between the interior curved surface 16 and the tongue of the animal. After the edible material reaches the rim 8, the smooth walls of the free end 8*a* of the aperture 8 causes the edible material to be directed into a mouth of the animal. And, any edible food not consumed in that "gulp" or tongue wiping will likely fall back into the cavity of the bowl, eliminating or reducing mess adjacent the outside of the bowl. The guiding of the edible material into the mouth of the animal also applies in situations in which the animal is licking the edible material off an underside (i.e. interior side surface 8*c*) of the aperture or rim 8. Consequently, no food or liquid is ejected onto the exterior of the container 2 (e.g., the food or liquid does not spill outside the container 2 onto the floor thereby creating a mess that needs to be cleaned up). It should be noted that the curved and basically upwardly pointing end 8*a* of the aperture 8 also assists in providing a smooth rounded surface for the tongue of the animal so as to prevent the animal from feeling uncomfortable or being hurt during the edible material consuming process. Rather, the access opening is preferably neither flat and parallel to the base nor is it downwardly extending, i.e., it does not extend downwardly and inwardly toward the center of the cavity of the bowl.

In addition, the container 2 reduces or prevents the ejection of edible material that is present in the container 2. For example, the base 10 includes a surface (e.g., non-skid) that maintains the container 2 in a substantial stationary position. As such, any movement of the container 2 (due to force from, for an example, an excited dog eager for a meal or from a person (e.g., owner) accidentally kicking the conventional container) or the dog's act of eating is prevented or substantially reduced as a result of the base 10. As such, no edible material should be accidentally ejected from the container 2. Further, even if there is enough force to cause the container 2 to move, the inward angle of the rim 8 reduces or prevents entirely the ejection of edible material from the container. For example, when there is an exterior force that is able to cause the container 2 to move and eject edible material from the container 2, such ejected edible material may move in an upward direction before possibly contacting the inside of the aperture or rim 8. In the case that the ejected edible material does contact the rim 8, the rim 8 and its shape and contour causes the almost-ejected food to fall back into the container 2, therefore preventing a mess. And, the presence of the protrusion on the outside of the container not only serves to allow the container to be supported by a support or tripod, allows for easier placement of the container on a floor, but, importantly, can reduce the tendency of the container to tip over as the protrusion will come into contact with the floor and the bowl/container tend to right itself as a consequence of the location of the protrusion. It thus prevents or at least retards tipping over of the container and its contents. Location of the protrusion at about the center or mid-point of the height of the overall container, along with the range of the diameter of the aperture vis a vis the largest or widest diameter of the "belly" of the bowl, at or near the protrusion, reduces greatly the mess adjacent to a container, with edible food, even during the eating of the same by an animal.

Figure 6:
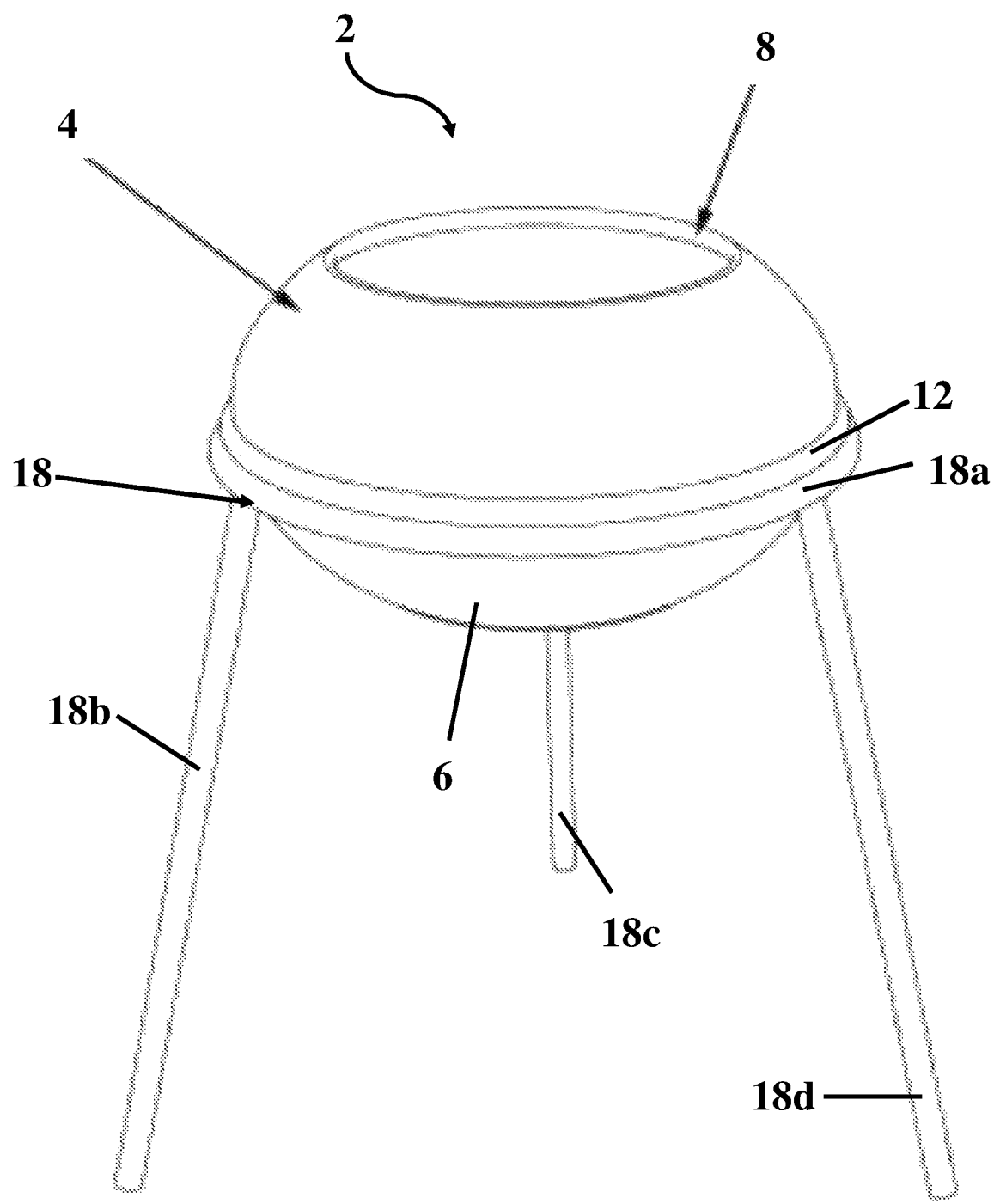
FIG. 6 shows a side perspective view of a container for holding edible material as shown in FIG. 1, further provided with a tri-pod-like support platform, according to an embodiment of the invention.

FIG. 6 is a perspective view illustrating a support platform 18 like a tripod having the container 2 placed thereon. In one exemplary embodiment, support platform 18 is integral with the container 2. In another exemplary embodiment, the support platform 18 is entirely separate and yet connectable to the container 2. The support platform 18 includes a support portion or ring 18a that is capable of holding the container 2 and is provided with one or more legs or support members 18b, 18c and 18d. The support members 18b-18d are legs extending downwardly and outwardly from a support ring 18 which fits below and supports above it the protrusion 12. Each leg has a first end that is screwed in or welded or formed and connected to the support portion 18a and a second free end meant to contact the ground surface. In another exemplary embodiment, each of the free ends of the support members 18b-18d include a non-skid surface (a rubber tip) that prevents or substantially reduces movement of the container 2 due to an exterior force when the device is placed on the floor. The support members 18b-18d are configured to raise the support portion 18a—the ring, a specified predetermined distance above a surface that is contacting the free ends of the support members 18b-18d such that the support portion 18a is not in direct contact with such surface. In an exemplary embodiment, the support members 18b-18d are all the same size and shape. In another exemplary embodiment, the support members 18b-18d are long and thin rods with sufficient strength and rigidity to support the bowl or container 2, even when the inner cavity is filled with foodstuff.

In the present embodiment the support portion 18a is a hollow ring having a central opening. Such opening allows at least a part of the lower portion 6 (including the base 10) to pass downwardly through the opening. The diameter of the support portion 18a and the ring of the support platform 18 in combination with the outwardly extending protrusion 12 of the container 2 prevents the rest of the container 2 from passing down through the opening. Rather, the container will be supported above the floor by the support ring. This spaces the container at an appropriate height to facilitate the ease of eating/consumption by the animal. The legs can be fixed in height or telescopically adjustable, individually or as a group.

More specifically, a radial dimension of the protrusion 12 can be substantially the same as a radial dimension of the inside of the ring of support portion 18a such that the protrusion 12 is prevented from passing downwardly through the opening of the support portion 18a. In an exemplary embodiment, the radius of the protrusion 12 is too large such that at least a portion of lower portion is prevented from passing downwardly through the opening of the support portion 18a. Consequently, the protrusion 12, or at least a portion thereof, rests on top of the upper surface of the ring of the support portion 18a, thereby causing the container 2 to be suspended by the support platform 18. Preferably, the diameter of the opening of the support portion is only slightly greater than the diameter of the protrusion so the two pieces mate and are adjacent to one another with the protrusion on the approximate center of the height of the container resting stably upon the top surface of the ring of the tripod/support. The protrusion can sit on top of the ring of the support (without the container 2 falling through the opening) or the lower hemispherical component of the container can sit upon the top surface of the ring of the support.

Figure 7:
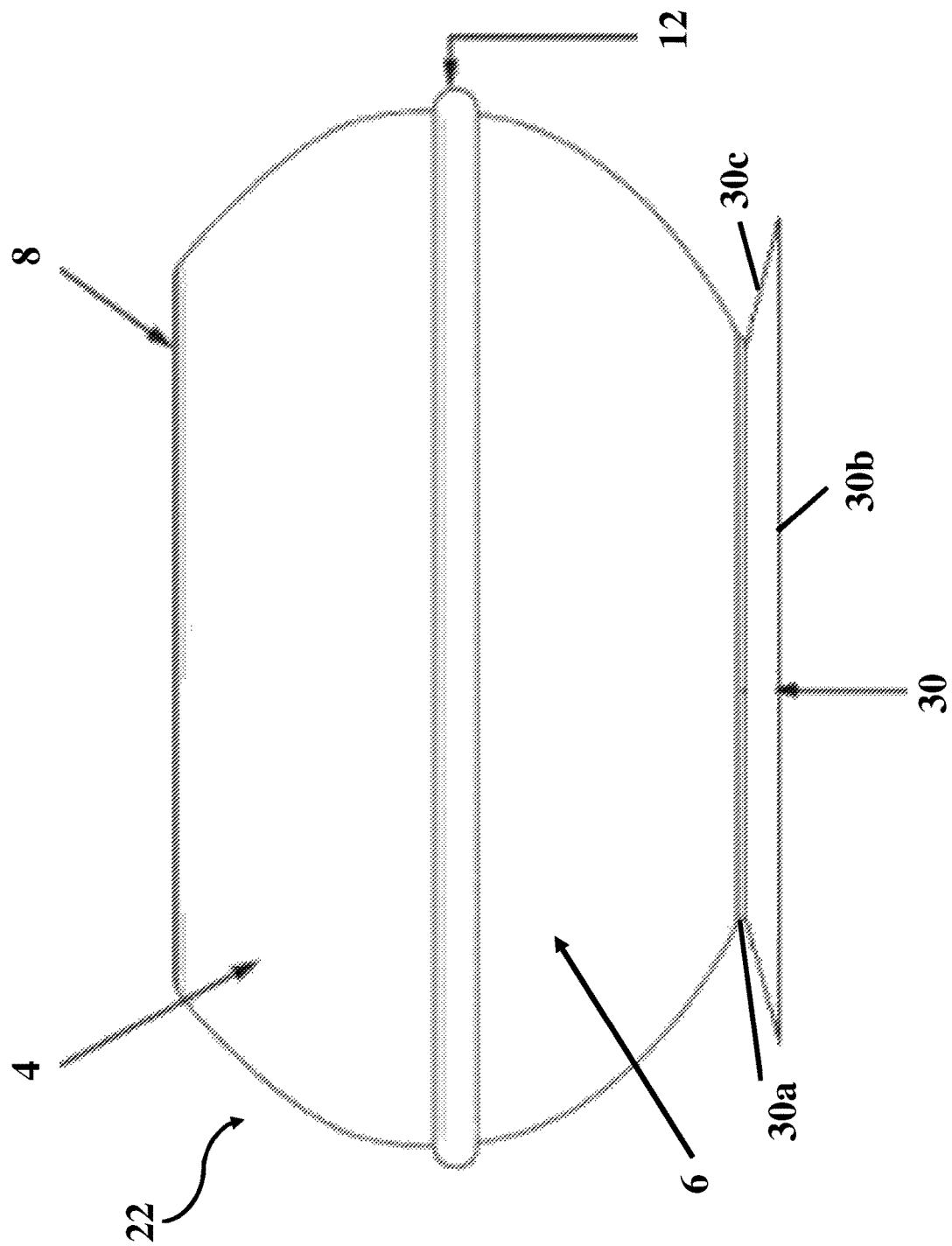
FIG. 7 shows a side elevational view of a container for holding edible material having an outwardly extended base for support of the same on a floor or planar surface, according to an alternative embodiment of the invention.

FIG. 7 illustrates an alternative and the preferred, single element embodiment (although the two piece embodiment may, visually, appear the same) in which a container 22 includes an upper inverted hemispherical portion 4, a lower hemispherical portion 6, an access aperture, opening or rim 8, preferably further including a radially, outwardly extending protrusion 12 and a downwardly extended base element 30. As shown in FIG. 7, which is a side view of the container 22, the extended base 30 is similar to the base 10 (see FIG. 3) with the exception that the base 30 includes an outwardly tapered surface 30c and is configured to have a bottom surface 30b that covers more surface area than the top surface 30a of the base which corresponds to the very bottom of the lower hemispherical portion 6. In an exemplary embodiment, the base 30 may include a non-skid rubber or rubber bonded material, or any other material that helps to prevent the container 22 from sliding when placed on a planar surface. As shown in FIG. 7, the first or top surface 30a is secured or connected to the bottom end of the lower hemispherical portion and the second surface 30b (of greater diameter) of the tapered surface 30c is to be placed on the floor. The top surface 30a is raised above the bottom surface 30b by a predetermined thickness or distance and, the amount of surface area provided by the bottom surface helps to ensure that the device will not easily tilt over nor be easily laterally moved. In other words, the tapered surface 30c extends from the top surface 30a by an angle towards the bottom surface 30b. As a result of this configuration, the top surface 30a has a surface area that is substantially equal to the surface area covered by the bottom end of the lower hemispherical portion 6 and the bottom side 30b has a surface area far greater than both the top surface 30a and the bottom end of the lower portion 6. Consequently, the base 30 is able to assist the container 22 in maintaining a stable position. This is due to the fact that the bottom surface 30b tends to prevent the rest of the container 22 from accidentally tipping over or being moved by animal access to the contents of the container.

Figure 8:
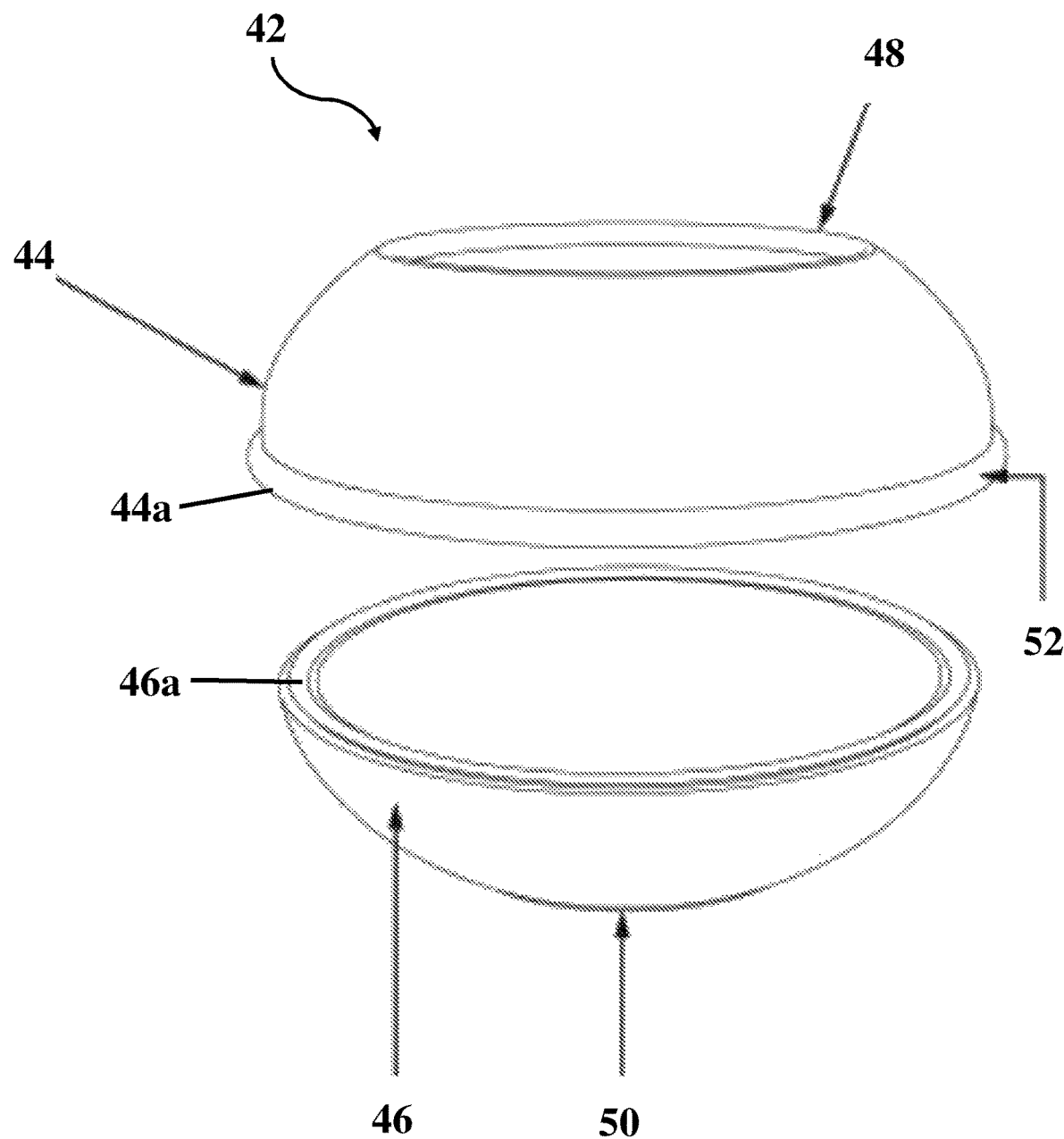
FIG. 8 shows a top and side exploded and perspective view of a container for holding edible material, according to yet another alternative embodiment of the invention.

FIG. 8 is a perspective and exploded view that illustrates another embodiment of the present invention in which a container or food bowl 42 includes an access opening or central aperture or rim 48, an upper, hemispherical portion 44, a lower hemispherical portion 46 (the upper portion having a flattened top and the bottom having a flattened base. A flat and floor-engaging base 50 and a radially extending protrusion 52 at the intersection of the bottom end of the upper portion and the top end of the lower portion is provided, i.e., where the two portions meet and mate to form a single enclosed hemispherical-like cavity for the foodstuffs. The rim or aperture 48, the base 50 and the outward protrusion 52 are substantially similar to the aperture 8, the base 10 and the protrusion 12 of the container 2 as described in FIGS. 1-6. The upper hemispherical portion 44 and the lower hemispherical portion 46 are substantially similar to the upper portion 4 and the lower portion 6 as described in FIGS. 1-6, with the exception that each of the upper portion 44 and the lower portion 46 includes an illustrated mating attachment mechanism 44a, 46a that allows the upper portion 44 and the lower portion 46 to be selectively attached to each other without using extra materials (e.g., glue, tape, cement, etc.) or tools or machining (e.g., welding, etc.). In other words, the attachment mechanism 44a, 46a can be any mechanism on the upper portion 44 and the lower portion 46 that allows the upper portion 44 to be coupled and uncoupled to the lower portion 46. Such separation allows the container 42 to be easily cleaned, stored and/or packaged. An outward and radially extending protrusion 52 is provided on upper portion 44. This protrusion, like the others described, can extend entirely around the major diameter of the container or can be in segments extending around or even a single segment. The purpose and function of the protrusion is as an aid in assembly, holding and also for placement of the same in a support ring of a tripod or other support mechanism.

In one exemplary embodiment, the upper portion 44 and the lower portion 46 may be attached together via a screw mechanism 44a, 46a. In this embodiment, the upper hemispherical portion 44 may include a downwardly facing flat surface with a spiral groove 44a (or a threaded helical edge) e.g., encircling the bottom end of the upper portion 44 and the lower hemispherical portion 46 may include a corresponding spiral groove 46a on a flat surface (or a threaded helical edge) e.g., encircling the top end of the lower portion 46, such that when the upper portion 44 is situated on the lower portion 46, the upper portion 44 (or lower portion 46) can be rotated (about the vertical axis X (similar to that shown in FIG. 3) passing through the center of the aperture or opening 48 and the base 50) with respect to the lower portion 46 (or the upper portion 44) thereby allowing the helical groove 44a of the upper portion 44 to screw into and interlock with the helical groove 46a of the lower portion 46. The grooves of the upper and lower portion are machined or formed to mate with one another and provide a seal for the respective elements. For example, to interlock the helical groove 44a with the helical groove 46a, the upper portion 44 (or lower portion 46) may be rotated clockwise (or counter-clockwise) about axis X while the helical groove 44a and the helical groove 46a are in contact with each other. At a predetermined point, the upper portion 44 (or lower portion 46) can no longer be rotated thereby locking the upper portion 44 to the lower portion 46. In another example, to release the upper portion 44 from the lower portion 46, the upper portion 44 (or lower portion 46) may be rotated in the opposite direction about axis X, such as counter-clockwise (or clockwise), thereby causing the helical groove 44a to be released from interlocking with the helical groove 46a. In an exemplary embodiment, the helical groove 44a may include a male thread, and the helical groove 46a may include a female thread. In another exemplary embodiment, the helical groove 44a may include a female thread, and the helical groove 46a may include the corresponding and mating male thread.

In another exemplary embodiment, the upper hemispherical portion 44 and the lower hemispherical portion 46 may be attached together via a snapping mechanism 44a, 46a. In this embodiment, the upper portion 44 may include a snap insert 44a on the bottom planar end of the upper portion 44 and the lower portion 46 may include a corresponding snap receiver 46a on the top planar end of the lower portion 46, such that when the upper portion 44 is situated on the lower portion 46, the snap insert 44a of the upper portion 44 can be inserted into the snap receiver 46a, thereby allowing the snap insert 44a of the upper portion 44 to interlock with the snap receiver 46a of the lower portion 46. In an exemplary embodiment, the snapping mechanism 44a, 46a may include a simple mechanical release mechanism by which the snap insert 44a of the upper portion 44 can be released from the snap receiver 46a of the lower portion 46, so as to easily allow for the separation of the upper portion 44 from the lower portion 46. In yet another exemplary embodiment, the upper portion 44 includes the snap receiver 46a and the lower portion 44 includes the snap insert 44a. Other mechanisms can be used for selectively assembling and holding and then allowing disengagement of the respective upper and lower hemispherical portions.

In yet another exemplary embodiment, the upper portion 44 and the lower portion 46 may be attached together via a magnetic mechanism 44a, 46a. In this embodiment, the upper hemispherical portion 44 may include a magnet 44a on the bottom planar edge or horizontal end (e.g., encircling the bottom end) of the upper hemispherical portion 44 and the lower hemispherical portion 46 may also include a magnet on the top, planar and horizontal end (e.g., encircling the top end) of the lower hemispherical portion 46. The magnet 44a and the magnet 46a are situated such that a pole of the magnet 44a is facing an opposite pole of the magnet 46a. In other words, if a side of the magnet 44a directly facing the magnet 46a is a north pole, then a side of the magnet 46a facing the magnet 44a is a south pole, and vice versa. As a result of this configuration, the magnet 44a and the magnet 46a can be magnetically attracted to each other thereby causing the magnet 46a and the 44a to interlock until force overcoming the magnetic attraction is used to purposely separate the magnet 44a from the magnet 46a. It should be noted that the magnet 44a may be a first set of magnets that include at least one magnet and that the magnet 46a may be a second set of magnets that include at least one magnet.

Figure 9:
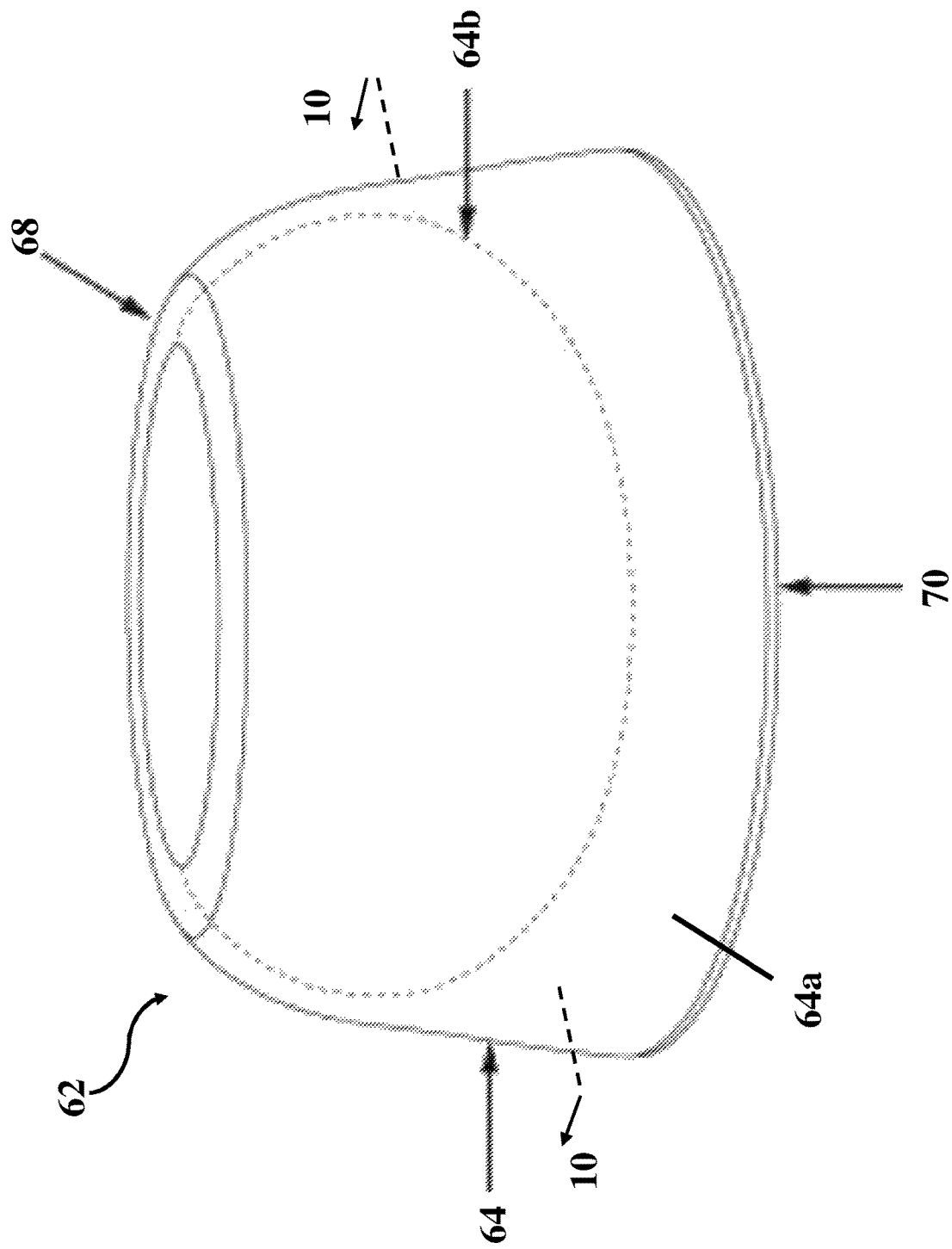
FIG. 9 shows a top and side perspective view of a container for holding edible material, according to yet another alternative embodiment of the invention.
Figure 10:
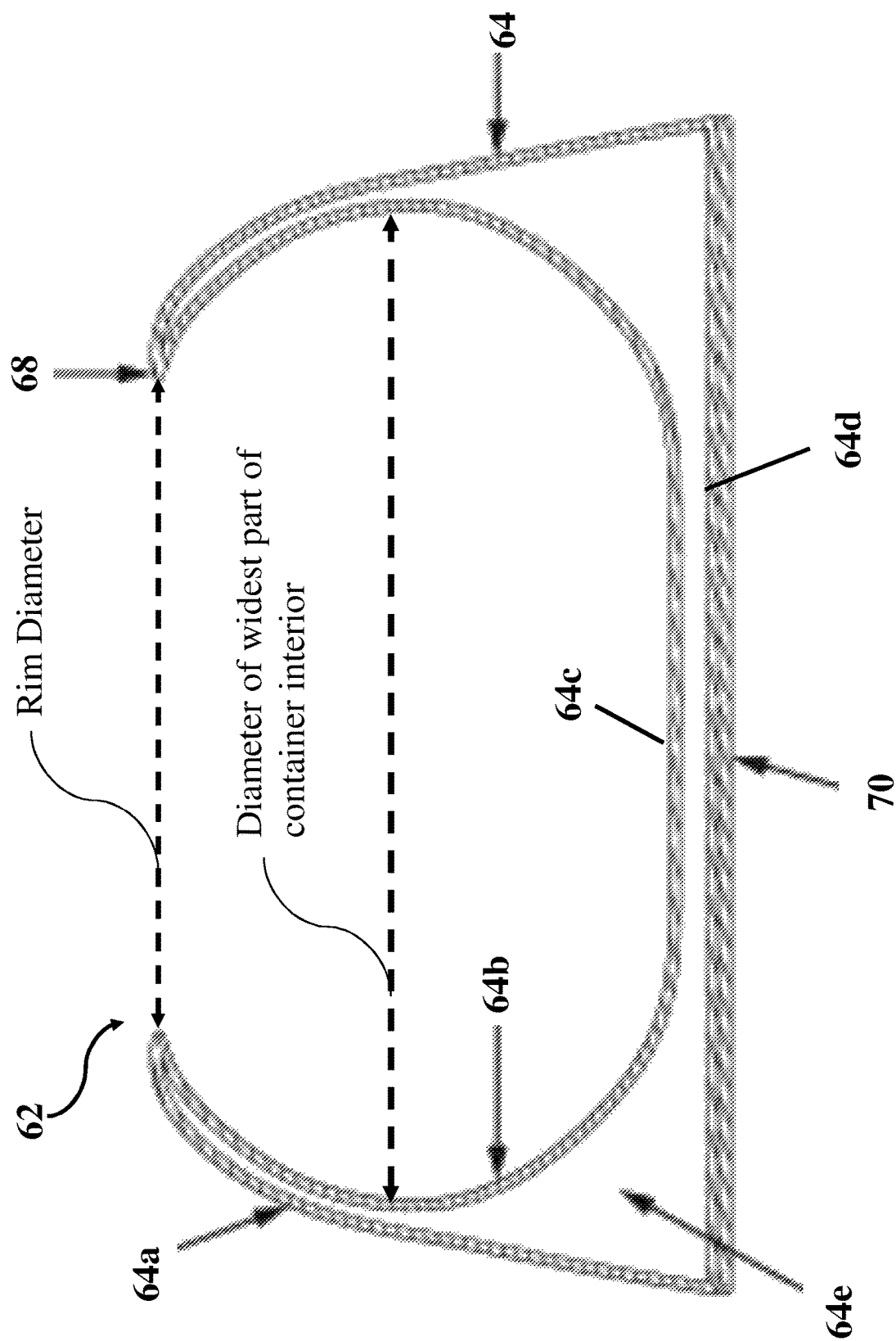
FIG. 10 shows a cross-sectional view of a container for holding edible material, taken along the lines 10-10 of FIG. 9, and shows the details of the alternative embodiment shown in FIG. 9.

FIGS. 9 and 10 illustrate yet another embodiment in which a container 62 comprised of two hemispherical elements which mate to form a large belly bowl with a central aperture and a base are formed. Yet, here, the food holding cavity includes a surrounding and supporting large container body 64. That body 64 includes a central opening or rim 68 and a support base 70. As shown in FIG. 9, which is a perspective view of the container 62, the container 62 is a cavity-like receptacle with an opening that may be used, for example, to hold solid (or semi-solid) inorganic or organic substances for animal consumption (e.g., food, pet food (dry or wet), medicine, vitamins, supplemental nutrients, etc.) and/or liquid (e.g., water, medicine, vitamins, supplemental nutrients, etc.). Here, the central opening or rim 68 covers and is superimposed over the aperture of the top hemispherical component. Alternatively, the large container 62 can be formed as a single piece, with the outside wall 64 and the inside wall of the hemispheres of the cavity being machined or formed as a mere continuation of sheet metal, e.g., stainless steel. In an exemplary embodiment, the container 62 may be in the general shape of a bowl with floor-contacting base and a large central opening or aperture for gaining access to the contents of the cavity holding the foodstuff. The container 62 may be made of materials that include, but are not limited to, stainless steel, plastic, silicone, melamine, ceramic, china, wood, glass, and rubber. The lip or aperture here is shown as a planar surface but it should be appreciated that the actual inwardly directed lip or aperture is a smooth wall as that shown in FIG. 3.

As shown in FIG. 10, which is a cross-sectional view of another embodiment, i.e., of the container 62 of FIG. 9, the body 64 includes an exterior, smooth wall, circular side surface 64a, an interior bowl-like and smooth wall, side surface 64b, an interior and basically flat base surface 64c, an exterior or bottom and flat base surface 64d. A hollow interior 64e is defined between surfaces 64a, 64b, 64c and 64d. A hollow cavity with a large belly section is formed for holding the foodstuff for the animals. A central aperture is provided extending across the top of the upper portion of the container. The ratio of the diameter at the top of the container to the diameter of the holding cavity at about the midpoint of the height of the container is in the range of about 50% to 90% with the preferred range being about 74% to 83%. These ratios allow for quite a bit of food to be held in the belly of the container and for the animal to have easy access thereto by snout or tongue and, yet, the ears of the animal will not become messy and the food will basically remain within the container during the feeding process. And, as mentioned above, the ratio produces a curvature of the access opening that allows animals to be able to lick food off the underside of the opening, i.e., the opening guides food into the mouth of the animal and keeps food from being flung outside or stuck under the rim.

The exterior base surface 64d is a substantially a flat surface, which allows the container 62 to balance or hold itself steady on a floor-like surface without falling over (i.e. be maintained in an upright position). The surfaces 64a, 64b, 64c and 64d are mere material continuations of one another and define a central, upwardly open cavity (for the food) with the base on the bottom. Various configurations to the exterior side surface can be provided. Various configurations to the interior side surface and interior base surface are also possible although it is desired that the inside surfaces be smooth walls for easing the consumption of food by the animal and for washing. The exterior base surface 64d may be in the shape of a circle, an oval and/or a polygon (e.g., triangle, square, rectangle, pentagon, hexagon, etc.) or may have an abstract or defined shape. It, too, can be coated with slip-resistant material. In the present embodiment, the exterior base surface 64d has an outside curved rim or edge, and the exterior side surface 64a includes a top, inwardly extending portion which defines the top of the aperture and a bottom portion which "turns" and becomes the base or bottom of the container. The bottom portion of the exterior side surface 64a extends from the edge of the exterior base surface 64d at a first angle towards a center of the container 62, such that the bottom portion of the exterior side surface 64a is a substantially upwardly straight smooth surface. The top portion of the exterior side surface 64a is connected to, forms or is a separate holding member for a separable central rim or aperture 68. The top portion of the exterior side surface 64a is a substantially curved smooth surface that extends at an angle from the bottom portion of the exterior side surface 64a towards the center or cavity of the container 62.

The interior base surface 64c is a substantially flat surface. The interior base surface 64c may be in the shape of a circle, an oval and/or a polygon (e.g., triangle, square, rectangle, pentagon, hexagon, etc.) or may have an abstract or defined shape. In the present embodiment, the interior base surface 64c has a curved side wall or edge, and the interior side surface 64b includes a top portion and a bottom portion. The bottom portion of the interior side surface 64b extends from the curved side edge of the interior base surface 64c at a first angle away from a center of the cavity of the container 62, such that the bottom portion of the interior side surface 64b is a substantially curved smooth surface. The top portion of the interior side surface 64b is connected to the lower portion of the interior side surface 64b and to the rim 68. The inside surface 64b and the exterior surface 64a meet at the top and form the central rim 68. Here, too, the rim or central aperture is smooth walled and preferably with a radius of curvature which is small in comparison to that of the internal side wall 64b as it extends around the container and flows into the bottom surface 64c. The exterior side surface 64a is configured to generate more surface area at a bottom of the container body 64 than a top portion of the container body 64. Such configuration allows the container body 64 to be stable such that it cannot be easily tipped over. On the other hand, the interior side surface 64b is a smaller and smooth surface that assists the container 62 in holding the food that is consumed by, for example, an animal. As such, by having a curved surface, the interior side surface 64b facilitates an easier time for an animal to, for example, lick food on an interior base surface 64c toward the rim or top aperture, upwardly and via the interior side surface 64b, and into a mouth of the animal. The smaller belly of this container allows for a reasonable amount of food to be placed into the bowl with the use of the filler's eyes to guide the quantity and, yet, the large base allows for stability. Here the diameter of the belly of the bowl-like container at the widest point of the food holding container is less than or equal to about 86%. Reducing that will increase stability of the bowl and increasing the same will decrease stability but increase the quantity of food to be held within the cavity.

The hollow interior 64e is formed from the exterior side surface 64a, the interior side surface 64b, the interior base surface 64c and the exterior base surface 64d. Such hollow interior 64e allows for less material to be used in the manufacturing of the container 62 thereby causing the container 62 to be lighter in terms of weight and less expensive to manufacture and ship (due to using less materials). Of course, the device can be molded as a solid, too. As illustrated in FIG. 10, a narrow top portion of the hollow interior 64e is disposed between the top portion of the exterior side surface 64a and the top portion of the interior side surface 64b such that the top portion of the hollow interior 64e includes a first bowl thickness. As illustrated in FIG. 10, a bottom portion of the hollow interior 64e is disposed between the bottom portion of the exterior side surface 64a and the bottom of the interior side surface 64b such that the bottom portion of the hollow interior 64e includes a second thickness that is far greater than the first thickness. This, too, enhances stability.

The central opening, aperture or rim 68 is a continuation of the surfaces of the container body 64. The rim 68 may be made of the same material as the container 62 or be made of a different material from the container 2. It can be a separate piece securable and removable from the rim of the molded piece or integral therewith. The rim 68 should be smooth in interior circumference and may define a rounded edge or a top, flat small flange. The flange may be curved, rounded, rolled inward, curved inward, etc. The flange extends inwardly from the very top of both the exterior side surface 64a and the interior side surface 64b such that the free end or flange edge forms a continuous smooth surface, preferably with a small radius of curvature but extending inwardly with respect to the outside base. Here, too, the preferred ratio of the diameter of the aperture to the maximum diameter of the holding cavity is in the range of about 50 to 90% with the preferred range being between about 74-83%. The exterior side surface of the rim 68 forms a steady continuous surface with the exterior side surface 64a and the interior side surface of the rim 68 forms a steady continuous surface with the interior side surface 64b such that the rim 68 is a smooth wall continuation of the body 64.

In an exemplary embodiment, the rim 68 may have an inward overhang such that the rim 68 extends towards the center of the container 62. The amount that the rim 68 extends inwardly towards the axial center (axis X in FIG. 3) of the container 62 may be defined as a relationship between the diameter of the opening or aperture or that of the rim 68 and the diameter of the widest part of an interior or belly of the container i.e., at the cavity, as shown in FIG. 10. For example, the ratio of the diameters of the aperture 68 may range between 50-90% and preferably between 74% to 83%. The widest part of the container 62 is measured to include the diameter of the interior side surface 64b. In another example, if the widest part of the container 2 (e.g., interior side surface 64b) is 4 inches, then the aperture diameter would be in the range of no less than 2 inches, no more than 3.76 inches and the preferred range would be 2.96 inches to 3.32.

In another example, the free end or top flange of the rim 68 may be almost parallel with the level and flat interior base surface 64c. In one exemplary embodiment, the rim or aperture 68 can be integrally connected to the body 64. In another exemplary embodiment, the rim or aperture 68 can be removably attached from the body 64. In yet another exemplary embodiment, the rim or aperture 68 can be configured to extend further towards the center of the container 62 so as to allow an animal having a snout and/or non-erect ears (i.e. droop), such as a dachshund, a beagle, a lop-eared rabbit, etc., an easier time in consuming food or liquid from the container 62 without mess. The snout of the animal can enter the container 62, while the rim or aperture 68 keeps the non-erect ears of the animal from entering the container 62 and becoming dirty from the food or liquid within.

The bottom or base 70 is connected to the container body 64. It can be a separate sheet of material or eliminated for cost reasons. The base 70 may include a top side and a bottom side. The top side of the base 70 is connected to the exterior base surface 64d and the bottom side of the base 70 is in contact with a planar surface (e.g., floor) having the container 62 thereon. In an exemplary embodiment, the base 70 is integral to body 64. In another exemplary embodiment, the base 70 is separate from the body 64. The base 70 may be configured (by weight or if with a non-slip coating) to prevent the container from tipping over. Further, the bottom side of the base 70 may include a non-skid surface that prevents or substantially reduces movement of the container 62 due to an exterior force. As such, the base 70 is configured to maintain the container 62 in a stationary position. The base 70 may be composed of, or bonded in, rubber, silicone, or other material that prevents or substantially reduces movement of the container 62 due to an exterior force. In yet another exemplary embodiment, the base 70 may be composed of a same material as the container body 64 or may be composed of different materials from the container body 64. As shown in FIG. 5, the base 70 may substantially cover the exterior base surface 64d such that the exterior base surface 64d does not come into contact with, for example, a surface (e.g., floor) that the container 62 is on. In an exemplary embodiment, the base 70 may be made into any shape, such as, circle, rectangle, square, diamond, triangle, or any other polygon. In another exemplary embodiment, the base 70 may be substantially flat.

FIGS. 11-15 illustrate a container 82 of an alternative and indeed, the preferred embodiment of the present invention. The container 82 may be used, for example, to hold solid (or semi-solid) inorganic or organic substances for animal consumption (e.g., food, pet food (dry or wet), medicine, vitamins, supplemental nutrients, etc.) and/or liquid (e.g., water, medicine, vitamins, supplemental nutrients, etc.). In an exemplary embodiment, the container 82 may be in the shape of a bowl with a large base and a centrally, top-located aperture for access to the cavity within the bowl. The container 82 may be made of materials that include, but are not limited to, stainless steel, plastic, silicone, melamine, ceramic, china, wood, glass, and rubber.

Figure 11:
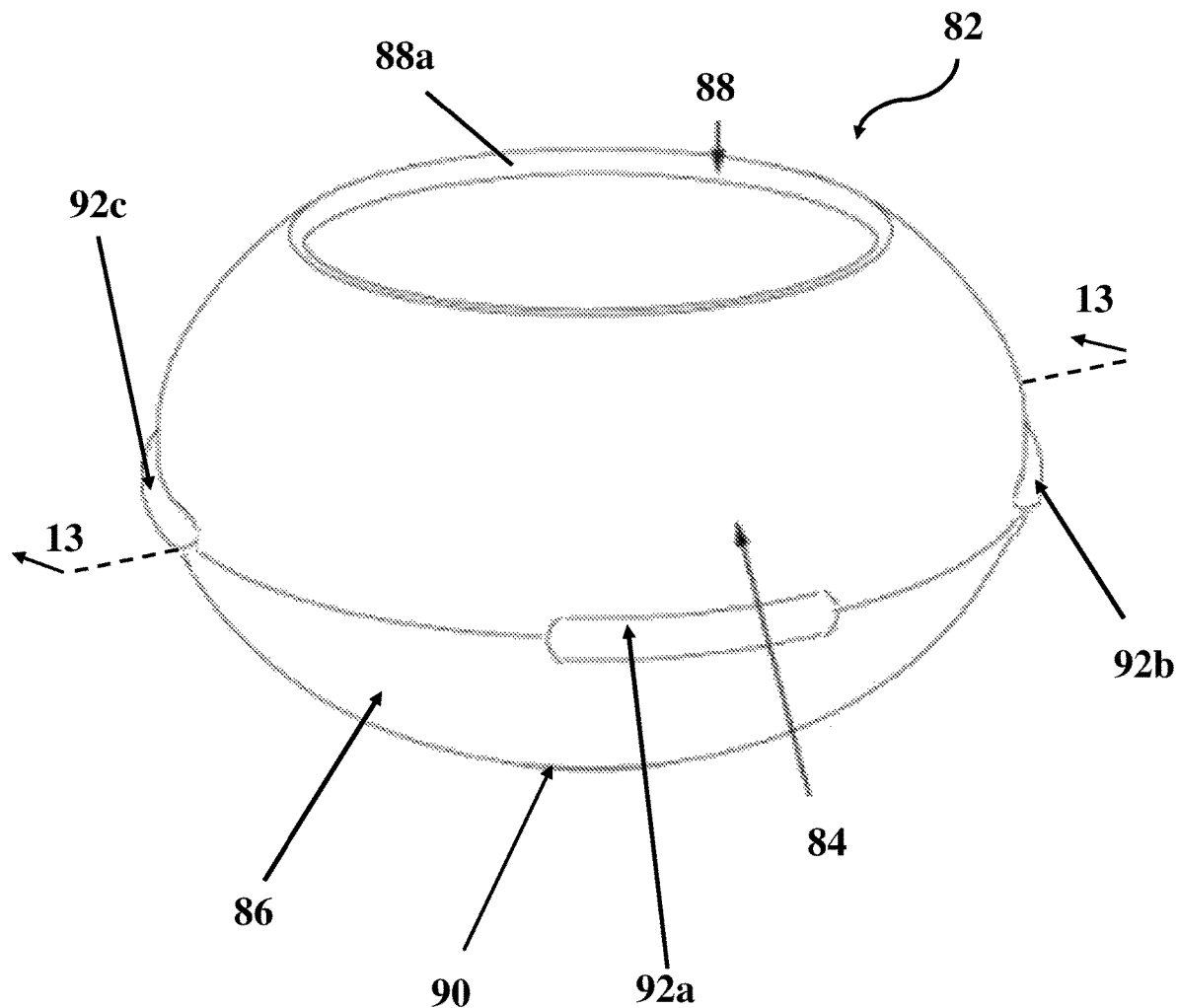
FIG. 11 shows a top and side perspective view of a container for holding edible material, according to a further alternative embodiment of the invention.

In FIG. 11, which is a perspective view of the container 82, the container 82 of the present and preferred embodiment includes an upper inverted cereal bowl shape portion 84, a lower cereal bowl shape portion 86, a top aperture or central opening defined by a smooth walled (and small radius of curvature) rim 88, a flat base 90 and an outwardly extending, from the center or belly of the bowl, protrusions 92a, 92b, 92c and 9d (not shown in FIG. 11) (collectively 92). These protrusions can comprise a single circumferential protrusion or many such segmented protrusions which are connected together around the circumference. As shown in FIG. 14, which is a top plan view of the container 82, the upper portion 84 is a downwardly and inwardly curved, from its bottom towards the top aperture or rim, smooth surface. The opening or access aperture is formed at the upper edge of the upper portion 84. The upper portion 84, its largest diameter at its bottom edge, and the top opening or access aperture 88 formed at the upper portion 84 are concentric with a center and vertical axis Y (See FIG. 13) of the container 82. Visually, the top portion resembles an inverted cereal bowl with an opening replacing the bottom of the cereal bowl. This upper portion is a hemi-spherical component for the bowl or container 82. A top edge of the upper portion 84 defines the rim or opening or access aperture 88. Preferably, the aperture has a smooth curved wall, with small radius of curvature, which extends from the outside wall of the upper portion to the smooth inside wall of the upper portion. A bottom and open end (corresponding to the largest diameter of the upper portion) which is open, downwardly, is secured to the lower portion 86—a right-side up open hemisphere element, resembling a cereal bowl.

In an exemplary embodiment, the upper portion 84 is integrally connected to the lower portion 86. Together they form a bowl like pet feeding container, with a closed bottom, an open top or aperture, and a large central cavity for holding the animal food. In one embodiment the upper and lower portions are formed, molded, spun, or otherwise made as a single piece and, yet, in another exemplary embodiment, the upper portion 84 and the lower portion 86 are separate manufactured elements such that a securing mechanism (e.g., glue, screwing, snapping, clipping, pressing, magnetically attached together, or any other coupling/decoupling methods, etc.) is used to couple the upper portion 84 and the lower portion 86 together. In yet another exemplary embodiment, the upper portion has the top opening or access aperture integral therewith and the lower portion 86 has its base 90 also a component of the lower portion such that the container 82 is comprised of only two parts—an upper portion with a central access aperture and wide diameter at its bottom and a lower portion with a wide diameter at its top which mates with the wide diameter of the upper portion and has a base for stable support. This permits easier cleaning, storing, shipping and/or packaging of the container 82. As the upper portion 84 extends from the bottom end of the upper portion 84 upwardly towards the access aperture or opening rim 88, the upper portion 84 curves inwardly towards the center of the container 82. Stated differently, the diameter of the upper portion smoothly yet perceptively increases as the upper portion continues from the central rim or access aperture 88 downwardly toward the bottom edge— the widest diameter, of the upper portion.

Figure 13:
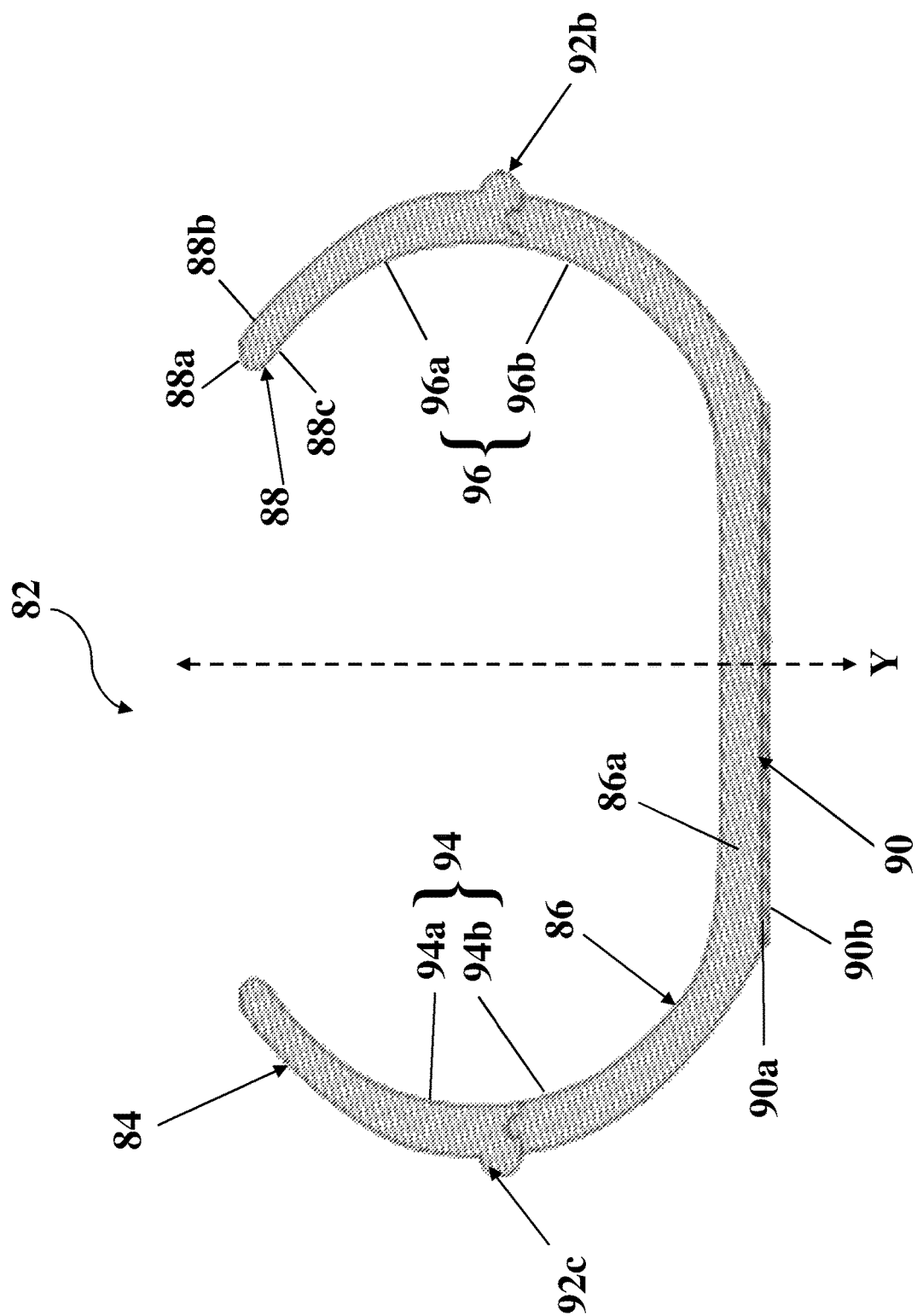
FIG. 13 shows a cross-sectional view of a container for holding edible material, as shown in FIGS. 11 and 12, taken along the lines 13-13 of FIG. 11 and shows the alternate embodiment shown in those FIGS.
Figure 14:
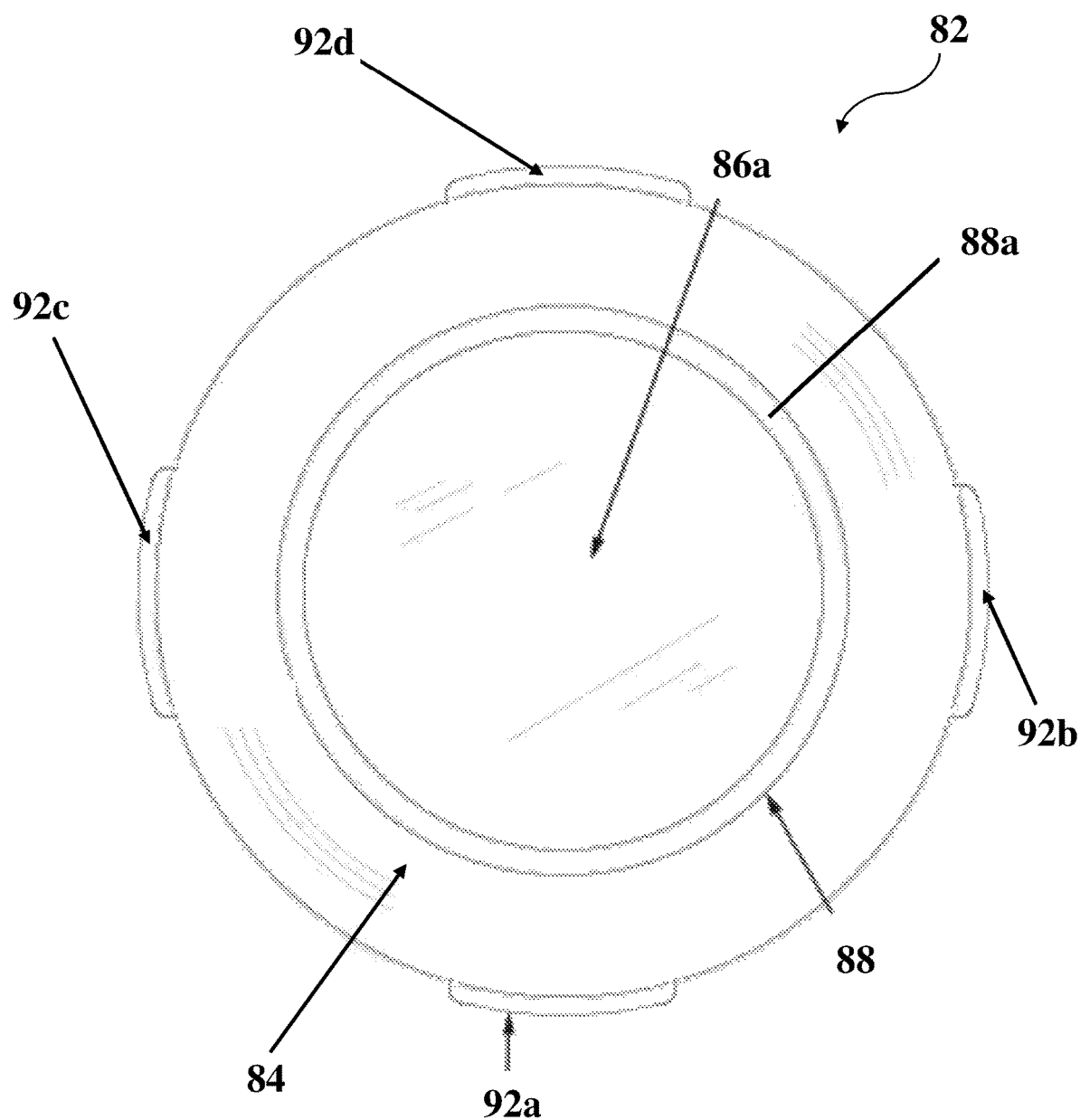
FIG. 14 shows a top plan view of a container for holding edible material, according to a further alternative embodiment shown in FIGS. 11-13.

In an exemplary embodiment, as seen in FIG. 13, the thickness of the wall defining the upper portion 84 is the same or only slightly decreases from the bottom end (widest diameter) of the upper portion 84 extending towards the top end and access aperture or rim 88 of the upper portion 84. This provides a thicker wall at or near the largest diameter, at the belly of the bowl, which is important for structural integrity when the bowl is filled with food.

As also shown in FIG. 13, which is a cross-section of the container 82, the upper portion 84 includes an upper, smooth walled, interior surface 94a. The lower portion 86 includes a lower, smooth walled, interior surface 94b and a base 86a.

The exterior of the upper and lower portions are meant to be smooth wall continuations (as are the interiors of the upper and lower portions) with the exception that one or more (preferably 4 spaced) radially extending and encircling protrusions are provided. The protrusions 92 are flanges or outward projections that are disposed on the upper exterior surface at its bottom edge such that the protrusions 92 extend outwardly away from the bottom end of the upper portion 84. Each of the protrusions 92 may include a first inwardly extending lip element or end that is connected to the upper portion 84 and a second, outwardly extending bulbous portion or end that is a free end. In addition, each of the protrusions 92 may have a lateral oblong shape. For example, the protrusions 92 may extend outwardly and away from the bottom end of the upper portion 84. The protrusions 92 each are disposed on the upper portion 84 at specific locations, such that each of the protrusions 92 cover at least a portion of the circumference of the bottom end of the upper portion 84. A groove extends around the lower edge of the protrusions and is located between the inwardly extending lip element and the outwardly extending bulbous portion. It mates with an upwardly extending bump, running around the lower portion so as to fit between the inwardly extending lip element and the outwardly extending bulbous portion of the protrusion(s).

In an exemplary embodiment, the protrusions 92 do not substantially encircle the entirety of the bottom end of the upper portion 84. In other words, there is empty exterior wall space between each of the protrusions 92a-92d. By having a limited number of protrusions 92 extending circumferentially around the upper portion, manufacturing costs decrease due to usage of less material in manufacturing the container 82. Although the embodiment illustrated in FIGS. 11-15 show protrusion 92a-92d, it should be noted that there may be more (e.g., greater than four) or less (e.g., one, two, or three) protrusions 92 extending outwardly from the upper portion 84. The protrusion(s) help to hold the container, to allow the upper portion to rotate vis a vis the lower portion (for screwing and unscrewing the same) and also facilitate the elevation of the bowl/container into a hole of a tripod or other holding device.

The protrusions 92 may be disposed on the upper portion 84 such that one of the protrusions may be separated from the nearest or adjacent protrusions at an equal distance or they can be non-uniformly spaced. Each of the protrusions 92 may have a curved or semi-circle cross-section, as shown in FIG. 13. Each of the protrusions can have a fanciful shape or design, such as a dog bone, a paw, a hot dog in a bun, etc. As such, each of the protrusions 92 may include a curved body that is round, spherical or squared off with rounded edges, i.e., without sharp edges, so that an animal does not become injured or annoyed by contact with the protrusions 92. In an exemplary embodiment, each of the protrusions 92a-92d may each include a shape that is different from each other. The protrusions 92 are configured such that a support platform (e.g., a support platform 18 of FIG. 6) may hold the container 82 above the floor. The protrusions provide surfaces for resting upon the open ring of a tripod or the inside edge of a hole in a feeder box.

Figure 15:
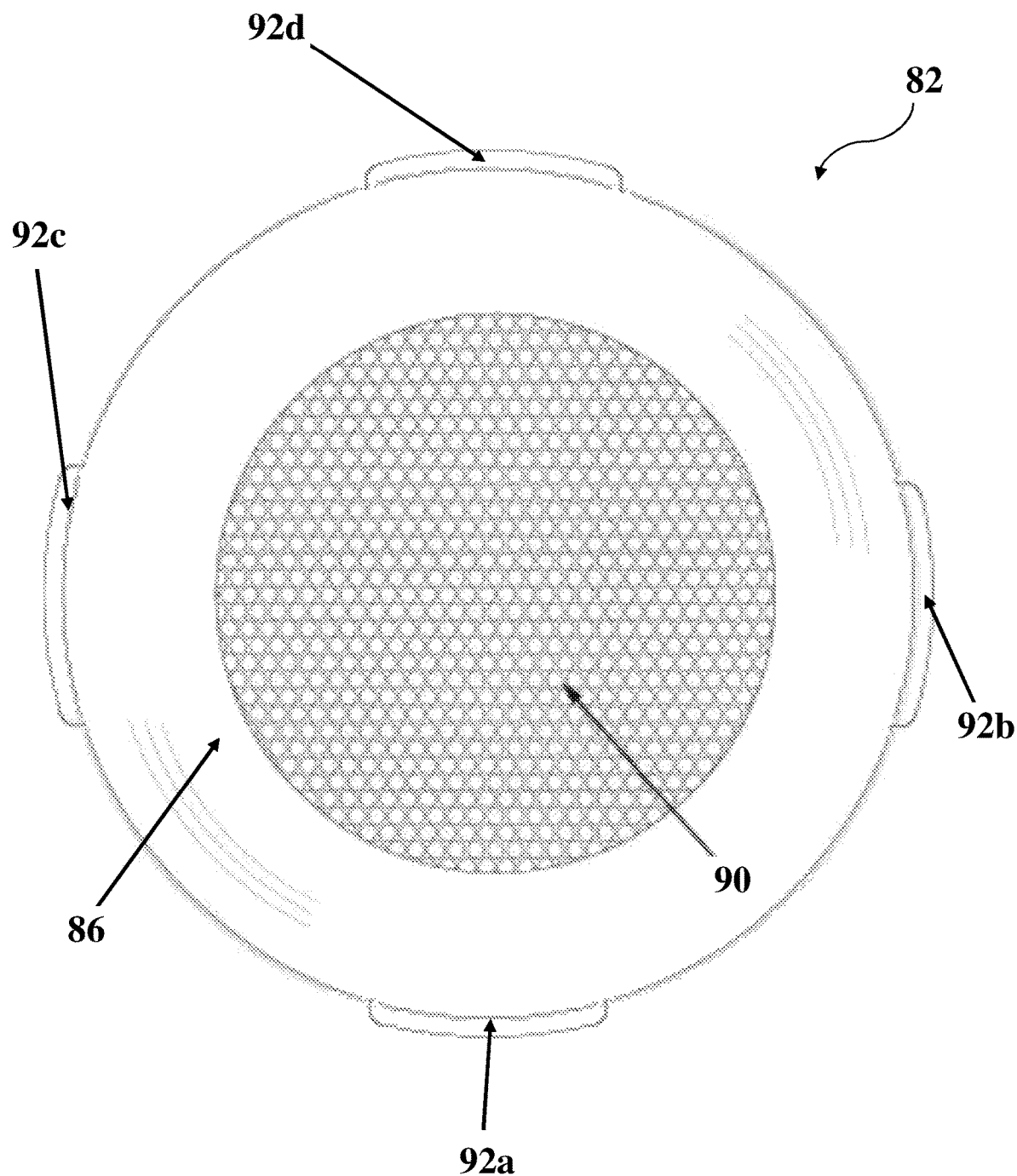
FIG. 15 shows a bottom plan view of the container for holding edible material, as shown in FIGS. 11-14, and is according to the further alternative embodiment shown in those FIGS.

As shown in FIG. 15, which is a bottom plan view of the container 82, the lower portion 86 is mostly flat with a slightly curved upwardly edge surface such that the lower portion 86 substantially forms a spherical cup with a substantially flat base such that the lower portion 86 (and by extension the container 82) can balance or hold itself steady on a surface without falling over even when filled with food up to and even above the largest diameter at the belly of the bowl. In an exemplary embodiment, the base 86a (see FIG. 13) is parallel with the rubber base 90. The lower portion 86 is concentric with a center axis Y of the container 82 and is aligned with its center directly below that of the access aperture of the upper portion. A top and open end of the lower portion 86 is connected to the bottom end of the upper portion 84 and a flat, solid and bottom end of the lower portion 86 is connected to the base 90. As shown in FIG. 13, the top end of the lower portion 86 includes a large central opening such that objects such as edible material can pass into the central cavity of the container. However, the bottom end of the lower portion 86 narrows in diameter as it proceeds towards the base to create a hollow interior or cavity that holds objects that have passed through the opening defined by the access aperture or upper portion's rim 88. In other words, the combination of the access aperture 88, the upper portion and the lower portion 86 with a closed base member results in a bowl-like vessel with a large belly or major diameter and a smaller access opening, the opening having a smooth wall with a small radius of curvature in comparison to the radius of curvature of the belly of the container and the inside and outside walls of the same. The upwardly extending bump of the bottom or lower portion fits into and is either permanently secured (by welding, machining, adhesive, press stamped from a single sheet of stainless steel, etc.) to the upper portion or the two pieces are maintained separable for cleaning and storage and, yet, can be easily assembled, as desired.

As the lower portion 86 extends from the base 86a towards the top end of the lower portion 86, the lower portion 86 curves outwardly away from the center or axis Y of the container 82. In an exemplary embodiment, the thickness of the upper portion 84 decreases from the bottom end (the major or widest diameter) of the upper portion 84 towards the top end or access aperture of the upper portion 84. Such feature allows the container 82 to store more food, still be stable, and have a lighter-weight due to less material being used. In yet another exemplary embodiment, the thickness of the lower portion 86 is constant from the bottom end of the lower portion 86 towards the top end (its major diameter or the widest diameter) of the lower portion 86. Such feature may allow the container 82 to be stronger and more stable as the weight of the container 82 is shifted towards the lower portion of the container 82.

In an exemplary embodiment, the protrusion 92 is disposed on the lower portion of the exterior surface 88b such that the protrusion 92 extends away from the bottom of the upper portion and away, too, from the top end of the lower portion 86. When the upper portion 84 and the lower portion 86 are secured to or extensions of each other, the upper exterior surface and the lower exterior surface form a smooth exterior curved surface (but for the protrusion) and the upper interior surface 96a and the lower interior surface 96b form a smooth interior curved surface 96.

The access aperture, top opening or rim 88 is a continuation of the upper portion 84 as shown in FIGS. 11-14. In an exemplary embodiment, the access aperture 88 is a smooth wall from the outside and inside walls of the upper portion with a small radius of curvature, a smooth wall 88a connecting the same. The access aperture or rim 88 encircles the entire top opening of the upper portion 84, thereby creating an opening that is concentric to the major diameter or widest opening of the upper portion 84 and to the Y axis, as shown. The rim 88 may be made of the same material as the container 82 or be made of a different material from the container 82. It can be integrated therewith during manufacture or a separate ring, washable and replaceable. The rim 88 is basically defined by a free curved end 88a, an exterior smooth side wall surface 88b and an interior smooth side wall surface 88c. No sharp edges are provided. The free end 88a may be curved, rounded, rolled inward, curved inward, etc. The free end 88a is connected to an exterior side smooth wall surface 88b and to the interior smooth wall side surface 88c such that the free end 88a, the exterior side surface 88b and the interior side surface 88c form a continuous smooth surface without sharp angles or edges.

Figure 12:
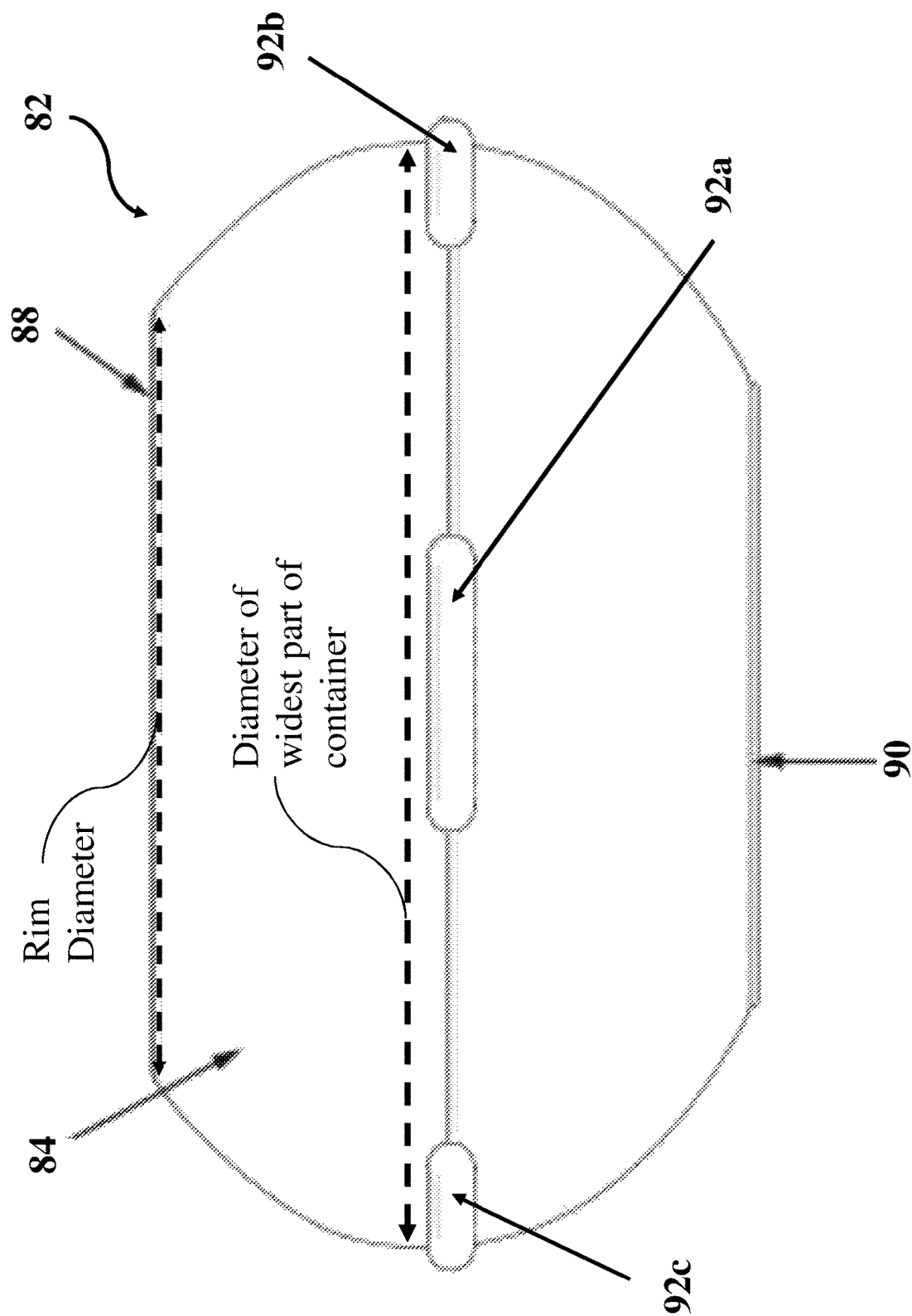
FIG. 12 shows a side elevational view of a container for holding edible material, according to the embodiment of the invention shown in FIG. 11.

In one example, the access aperture or rim 88 may extend inwardly such that the rim 88 extends towards the center or Y-axis of the container 82. In other words, the rim 88 projects inwardly towards a center of the container 82. The amount that the rim 88 overhangs inwardly towards the center of the container 82 may be defined as a ratio or dimensional relationship between the diameter of the access aperture or rim 88 and the diameter of the widest part of the container 82 (the major diameter; without consideration of the protrusions 92), as shown in FIG. 12. For example, the diameter of the access opening or rim 88 to the major diameter or widest diameter of the bowl, may range between 50% to 90% (preferably between 74% to 83%). This provides several benefits. It allows the access opening to be wide enough for ease of filling and allows the animal snout and/or tongue access to the contents for ease of eating. It allows for a large central cavity for a reasonable amount of food. It allows for stability of the bowl and importantly, allows for the preclusion of the ears of the animal from touching on the food while eating. It also substantially contains the food within the bowl so that the surrounding is maintained in a relatively hygienic manner. The construction of the present invention guides the food into the animal's mouth by allowing the animal to be able to lick food off the underside of the access opening without flinging the food out and prevents the food from collecting on the underside of the opening. The rim/access opening also keeps food/liquid from splashing and spilling out.

In another example, if the widest part of the container 82 (e.g., bottom end of upper portion 84 and/or top end of the lower portion 86) is 4 inches, then the access aperture or rim diameter would be in the range of 2.0 inches to 3.6 inches (yet, preferably between about 2.96 inches to about 3.32 inches). It should be noted that the widest part of the container 82 may be approximately measured as both the diameter of the bottom end of the upper portion 84 and/or the diameter of the top end of the lower portion 86.

In another exemplary embodiment, the access opening or rim 88 can be configured to extend even further towards the center of the container 82 so as to allow an animal having a more pointed snout and/or non-erect ears (i.e. droop), such as a dachshund, a beagle, a lop-eared rabbit, etc., an even easier time in consuming food or liquid from the container 82 without becoming or making a mess. The snout of the animal can enter the container 82, while the rim 88 keeps the non-erect ears of the animal from entering the container 82 and becoming dirty from the food or liquid within. A rubberized separate access opening can be a removable and replaceable piece which can be sized for the animal to be fed. The removable access opening, separately washable, can be selectively secured to and removable from the edge and side walls defining the access rim 88.

The base 90 is connected to at least a part of the lower portion 86, as shown in FIGS. 11-13 and 15. The base 90 may include a top side 90a and a bottom side 90b. In an exemplary embodiment, the top side 90a and the bottom side 90b extend over the same surface area. The top side 90a is connected to the bottom surface of the lower portion 86 and the bottom side 90b is intended to be in contact with a planar surface (e.g., floor) supporting the container 82 thereon. In an exemplary embodiment, the base 90 is integral to the lower portion 86. In another exemplary embodiment, the base 90 is separate from the lower portion 86. The base 90 may be configured to prevent the container from tipping over (by having great relative weight) or may merely further assist the base 86a of the lower portion 86 from tipping over. Further, the bottom side 90b of the base 90 may include a non-skid surface that prevents or substantially reduces movement of the container 82 due to an exterior force. As such, the base 90 is configured to maintain the container 82 in a stationary position. The base can be provided with various graphic elements, e.g., a dog bone, a paw, a name for the animal, number, etc. And, the surface of the base for contacting the floor need not be smooth but can be roughened to increase the anti-skid aspects of the same.

The base 90 may be composed of, or bonded in, rubber, silicone, or other material that prevents or substantially reduces movement of the container 82 due to an exterior force. In an exemplary embodiment, the base 90 may be composed of the same material as the lower portion 86 (or the container 82) or may be composed of different material from the lower portion 86 (or the container 82). As shown in FIG. 5, the base 90 may substantially cover the bottom end of the lower portion 86 such that the lower portion 86 does not come into contact with, for example, a surface (e.g., floor) that the container is on. In an exemplary embodiment, the base 90 may be made into any shape, such as, circle, rectangle, square, diamond, triangle, or any other polygon.

As such, the combination in the container 82 comprised of the upper portion 84 and the lower portion 86 constitute a physical cavity in the form of a large bowl or a holder to store edible material such as food (or liquid). The sizing of the opening or access aperture, i.e., the top rim 88, the outward bowing of the upper portion 84 and top end or major diameters of the upper and lower or bottom portion allows an owner to place the edible material into the container 82. When an animal, such as a cat or a dog, consumes the edible material that is placed in the container 82, the animal may utilize its chomping action to pick up and chew food and also use its tongue to lick the edible material off the interior curved surface 96, formed by the upper interior surface 96a and the lower interior surface 96b, of the container 82. When the animal performs such action, the smooth interior curved surface 96 guides the tongue of the animal towards the access opening or rim 88 of the container 82 such that the edible material is disposed between the interior curved surface 96 and the tongue of the animal. After the edible material reaches the rim 88, the smoothness and small radius of curvature of the rim 88 causes the edible material to be directed into the mouth of the animal. The guiding of the edible material into the mouth of the animal also applies in situations in which the animal is licking the edible material off an underside (i.e. interior side surface 88c) of the rim 88. Consequently, hardly any food or liquid is ejected onto the exterior of the container 82 (e.g., the food or liquid does not spill outside the container 82 onto the floor thereby creating a mess that needs to be cleaned up). It should be noted that the smooth wall and curved end 88a of the access aperture or rim 88 greatly assists in providing a smooth rounded surface for the tongue of the animal so as to prevent the animal from feeling uncomfortable or being hurt during the edible material consuming process.

In addition, the container 82 reduces or prevents the ejection of edible material that is present in the container 82. For example, the base 90 includes a surface (e.g., non-skid)

that maintains the container 82 in a stationary position. As such, any movement of the container 82 (due to force from, for an example, an excited dog eager for a meal or from a person (e.g., owner) accidentally kicking the conventional container) is prevented or substantially reduced as a result of the base 90. As such, no edible material is ejected from the container 82. Further, even if there is enough force to cause the container 82 to laterally move, the inward extension of the rim 88 reduces or prevents entirely the ejection of edible material from the container. For example, when there is an exterior force that is otherwise able to cause the container 82 to move and possibly eject edible material from the container 82, such ejected edible material may move in an upward direction before possibly contacting the underside of the rim 88. In the case that the moving edible material does contact the underside of the rim 88, the rim 88 and its inward extension causes the ejected food to fall back into the container 82, therefore preventing a mess.

The protrusion is helpful for holding the bowl/container and also serves to tip the container back into a stable position should be same be knocked onto its side. The protrusion serves to effectively prevent the container from tipping over with the access aperture facing the floor as the protrusion will cause the container to tip back towards stability, with the base onto the floor.

The support platform 18 of FIG. 6 may also be capable of suspending the container 82 thereon. In one exemplary embodiment, support platform 18 may be manufactured to be integral with the container 82. In another exemplary embodiment, the support platform 18 is separate from the container 82. As stated previously, the support platform 18 includes a support portion or ring 18a that is capable of holding the container 82, much like a tripod. It has one or more slightly outwardly extending legs or support members 18b-18d. The support members 18b-18d each have a first end that is connected to the support portion 18a and a second end that is a free end for sitting on the floor or other support surface. In an another exemplary embodiment, each of the free ends of the support members 18b-18d include a non-skid surface or rubber tip that prevents or substantially reduces movement of the container 82 due to an exterior force. The support members 18b-18d are configured to raise the support portion or ring 18a a specified predetermined amount above a floor or support surface that is in contact with the free ends of the support members 18b-18d such that the support portion 18a is not in contact with such surface. In an exemplary embodiment, the support members 18b-18d are all the same size and shape. In another exemplary embodiment, the support members 18b-18d are long and thin rods and for adjustability can be telescopic.

In the embodiment illustrated in FIG. 6, the support portion 18a is a hollow ring having an opening. Such opening allows at least a part of the lower portion 86 (including the base 90) to pass downwardly into the ring, i.e., through the opening. The support portion 18a of the support platform 18 in combination with the protrusion(s) 92 of the container 82 and/or the relative diameters of the lower portion and the inside of the ring prevents the rest of the container 82 from passing through the opening. More specifically, the outwardly extending protrusions 92 prevent the rest of the container 82 from passing through the opening of the support portion 18a. In an exemplary embodiment, the length of each of the protrusions 92 from a first side to the second opposing side is enough such that at least a portion of the protrusion 92 is prevented from passing through the opening of the support portion 18a. Consequently, the protrusions 92, or at least a portion thereof, rest on the support portion or ring 18a, thereby causing the container 82 to be suspended by the support platform 18.

Figure 16:
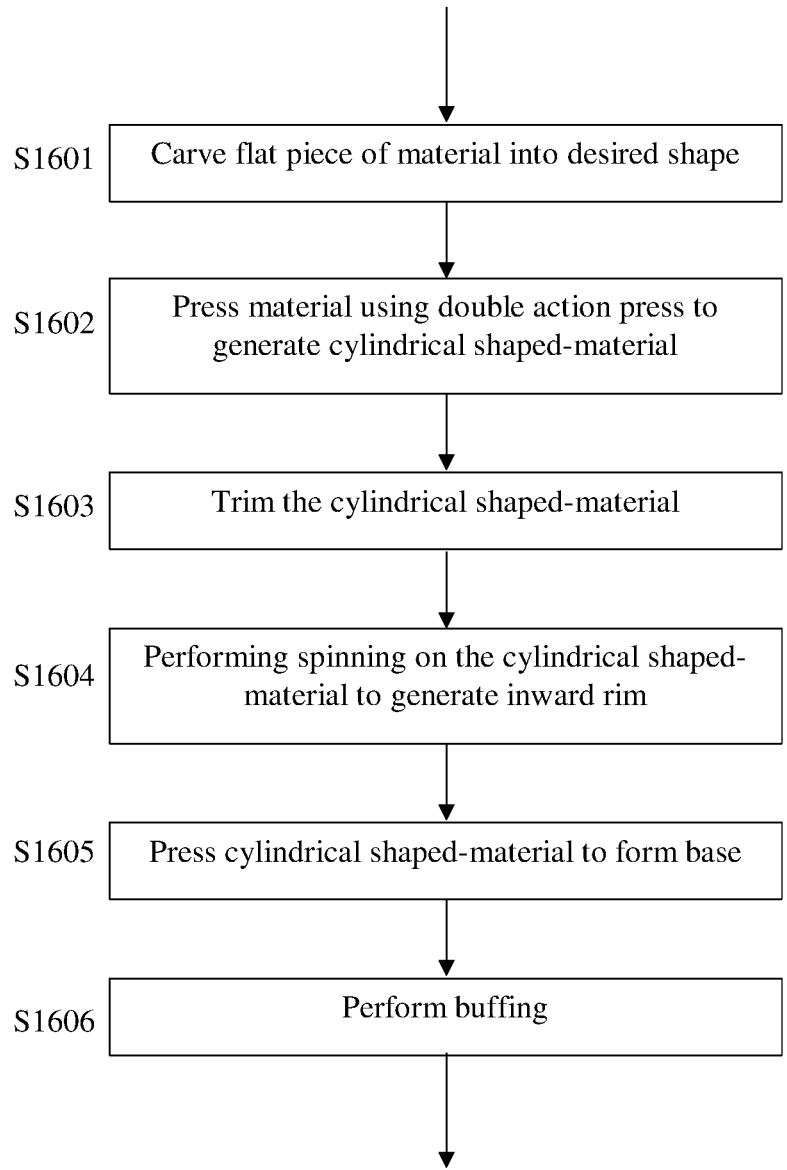
FIG. 16 shows a simple flow chart or table for illustrating the process for manufacturing the containers shown in the above-identified FIGS. 1-15.

FIG. 16 shows a process for manufacturing a container described in one of the embodiments illustrated in FIGS. 1-15 and as described herein. First, a piece of suitable, preferably moldable or shapeable material is provided. The material may include metal such as stainless steel grade 202. Stainless steel grade 202 may have the following chemical composition: 68% Iron (Fe), 17-19% Chromium (Cr), 7.50-10% Manganese (Mn), 4-6% Nickel (Ni), ≤1% Silicon (Si), ≤0.25% Nitrogen (N), ≤0.15% Carbon (C), ≤0.060% Phosphorous (P), and ≤0.030% Sulfur (S). It is suitable because it can be machined to specific dimensions with various features and is washable without rust becoming evident. Next, the material is spun, carved, molded, bent and shaped into a desired shape (e.g., circle, triangle, square, rectangle, or any other polygon) (step S1601). For example, in the present embodiment, the material is molded into the shape of a circular base. Next, a double action press is used to generate a cylindrical shaped-material (step S1602). This turns the stainless steel form into a bowl like shape, i.e., one with a flat base, a bulbous central or belly section and with a smooth access aperture. A single piece container is thus formed. If desired, the protrusion can be formed, too, by suitable machinery or the protrusion(s) can be secured to the outside of the upper and lower portion/

A double action press is a machine that is used to mold material. The double action press includes a supporting structure with a flat surface. In the center of the flat surface is a hole having a predetermined depth. For example, the predetermined depth may control how large the container to be produced will become when subjected to the press. The double action press also includes a first stamp and a second stamp. In this case, the first stamp is used to hold the material between the flat surface and the first stamp. The second stamp is held within a hollow interior of the first stamp (i.e. the second stamp is surrounded by the first stamp). As such, the material is placed upon the flat surface of the support structure. The first stamp is disposed above the flat surface and material comes down and holds the material between the flat surface and the first stamp. Next, the second stamp pushes the center of the material through the hole in the support structure such that a cylindrical shaped-material is created (e.g., via stretching the material). Because of the nature of metal, this process does not create wrinkles in the metal thereby creating a clean, smooth wall, cylindrical shaped-material into a bowl like profile with a flat base, curved inside and outside walls and a smooth access aperture. In this process, the double action press may have a straight draw of 4 to 4.5 inches and a 200 ton pressure.

The portion of the material held by the first stamp becomes a collar of the cylindrical shaped-material. As such, this collar portion is trimmed to create a cylindrical shaped-material without a collar (step S1603). Afterwards, using a spinning machine, the inward access opening or rim of the container as described in FIGS. 1-15, is created (step S1604). Next, a hydraulic press is used to create the flattened base (e.g., bottom end of the lower portion) of the container as described in FIGS. 1-15 (step S1605). For example, the hydraulic press may include a 200 ton pressure having three parts: base case iron mold, middle rubber punch and upper case iron punch. Such process adds a center bulge or belly to the container to form a bellied side view profile. Consequently, from this process, the container is produced. Next, primary buffing with abrasive fly wheel is performed on the container so as to eliminate draw lines, marks or scratches and final buffing is performed using soft buffing wheels for mirror polish (step S1606).

The aforementioned specific embodiments are illustrative, and many variations can be introduced on these embodiments without departing from the spirit of the disclosure or from the scope of the appended claims. Further, different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A container for holding and allowing domestic pet access and consumption to and of edible material held therein consisting of:
    a metallic upper portion defining a smooth outer wall surface and a smooth inner wall surface, having a bottom and a top, and shaped as an inverted, open to both the bottom and top, truncated hemisphere and defining a major diameter at the bottom edge of the inner and outer wall surfaces,
    a lower portion also defining a smooth outer wall surface and a smooth inner wall surface, having a bottom and a top, and shaped as an erect, open towards the top, closed at the bottom, truncated hemisphere and defining a major diameter at the top edge of its inner wall and outer wall surfaces,
    said major diameters of said upper portion and said lower portion being directly opposed to and adjacent one another and secured together into an integrated, large-bellied, outwardly bulbous and edible material holding cavity with substantially smooth inner and outer wall surfaces, said outer wall having a single ring defining a circumferential set of protrusions extending radially outwardly beyond the outer smooth surface of the wall of said upper portion, parallel to said major diameter of said upper and lower portions and having at least three unconnected segments,
    said upper portion further comprising at the top, a single smooth-curved edge defining an annular and thin walled aperture, recessed radially inwardly with respect to the major diameter of said truncated hemisphere of said upper portion and providing a sole opening for a pet's tongue and access to said holding cavity, the inside edge of said annular aperture presenting a single smooth transition, with a small radius of curvature in comparison to that of the thickness of said smooth inner-walled, edible material holding cavity at said major diameters, said single edge of said annular aperture extending from the outer wall surface to the inner wall surface of said upper portion,
    said lower portion, at the bottom, further comprising a container support base, and
    a thickness of said upper portion, defined between said outer wall surface and said inner wall surface, smoothly decreasing in thickness as the upper portion extends upwardly from the major diameter of said upper portion to said annular aperture.

2. The container as claimed in claim 1 wherein said lower portion is provided with a non-skid bottom surface.

3. The container as claimed in claim 1 wherein said upper portion and said lower portion are formed from stainless steel.

4. The container as claimed in claim 1 wherein said lower portion comprises a flat base which is larger in diameter than a diameter of said access aperture.

5. The container as claimed in claim 1 wherein said lower portion has a flat circular base and said base is covered with non-skid material.

* * * * *